US 6,503,680 B1

(12) United States Patent
Chen et al.

(10) Patent No.: US 6,503,680 B1
(45) Date of Patent: *Jan. 7, 2003

(54) LATEX PROCESSES

(75) Inventors: Allan K. Chen, Oakville (CA); George Liebermann, Mississauga (CA); Tie Hwee Ng, Mississauga (CA); Arthur Helbrecht, Oakville (CA); Emily L. Moore, Mississauga (CA); Abdisamed Sheik-qasim, Etobicoke (CA); Patricia A. Burns, Milton (CA); Nam S. Ro, Mississauga (CA)

(73) Assignee: Xerox Corporation, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/940,926

(22) Filed: Aug. 29, 2001

(51) Int. Cl.$^7$ .............................. G03G 9/087; C08K 3/20
(52) U.S. Cl. .................................. 430/137.14; 524/501
(58) Field of Search ........................ 430/137.14, 137.17; 524/501

(56) References Cited

U.S. PATENT DOCUMENTS

| | | | |
|---|---|---|---|
| 5,278,020 A | 1/1994 | Grushkin et al. | 430/137 |
| 5,290,654 A | 3/1994 | Sacripante et al. | 430/137 |
| 5,308,734 A | 5/1994 | Sacripante et al. | 430/137 |
| 5,344,738 A | 9/1994 | Kmiecik-Lawrynowicz et al. | 430/137 |
| 5,346,797 A | 9/1994 | Kmiecik-Lawrynowicz et al. | 430/137 |
| 5,348,832 A | 9/1994 | Sacripante et al. | 430/109 |
| 5,364,729 A | 11/1994 | Kmiecik-Lawrynowicz et al. | 430/137 |
| 5,366,841 A | 11/1994 | Patel et al. | 430/137 |
| 5,370,963 A | 12/1994 | Patel et al. | 430/137 |
| 5,403,693 A | 4/1995 | Patel et al. | 430/137 |
| 5,405,728 A | 4/1995 | Hopper et al. | 430/137 |
| 5,418,108 A | 5/1995 | Kmiecik-Lawrynowicz et al. | 430/137 |
| 5,496,676 A | 3/1996 | Croucher et al. | 430/137 |
| 5,501,935 A | 3/1996 | Patel et al. | 430/137 |
| 5,527,658 A | 6/1996 | Hopper et al. | 430/137 |
| 5,585,215 A | 12/1996 | Ong et al. | 430/107 |
| 5,650,255 A | 7/1997 | Ng et al. | 430/137 |
| 5,650,256 A | 7/1997 | Veregin et al. | 430/137 |
| 5,853,943 A | 12/1998 | Cheng et al. | 430/137 |
| 5,928,830 A | 7/1999 | Cheng et al. | 430/137 |
| 6,294,606 B1 * | 9/2001 | Chen et al. | 524/501 |

* cited by examiner

*Primary Examiner*—John Goodrow
(74) *Attorney, Agent, or Firm*—E. O. Palallo

(57) ABSTRACT

A process for the preparation of a latex polymer consistent with E/A (emulsion/aggregation/coalescence) toner manufacture. The process utilizes a standard (universal) latex composition and involves chain-transfer agent partitioning, emulsion polymerization that provides a latex polymer with a wide range of molecular properties. In particular, the process customizes a wide range $M_w$ (weight average molecular weight) latex, without substantially varying the $M_n$ (number average molecular weight) and hence, without substantially varying Tg (glass transition temperature) such that good toner performance is maintained. In a preferred process, a latex polymer is prepared by mixing a seed particle latex, generated by aqueous emulsion polymerization of a first portion of a monomer emulsion, with a second portion of the monomer emulsion and at least one chain-transfer agent. The mixing is done in the presence of a free-radical initiator and heated, and wherein the monomer emulsion comprises a mixture of polymerization reagents of at least one monomer, at least one chain-transfer agent, at least one surfactant, and water. This process may be applied to core-shell polymerization as well. These latex polymers are ideally suited in the manufacture of toner and developer for electrophotographic imaging and printing.

26 Claims, No Drawings

LATEX PROCESSES

BACKGROUND OF THE INVENTION

The present invention relates generally to latex processes and, more preferably, to aggregation and coalescence or fusion of a latex with colorant, such as pigment, dye, or mixtures thereof, and optional additive particles, to produce toners for use in a variety of applications inclusive of electrophotographic imaging and printing processes such as xerographic applications, digital imaging, color imaging and the like.

PRIOR ART

In general, toners are produced by aggregating a colorant with a latex polymer formed by batch or semi-continuous emulsion polymerization. For example, U.S. Pat. No. 5,853,943, the disclosure of which is totally incorporated herein by reference in its entirety, is directed to a semi-continuous emulsion polymerization process for preparing a latex by first forming a seed polymer. U.S. Pat. No. 5,928,830, the disclosure of which is totally incorporated herein by reference in its entirety, is directed to a semi-continuous emulsion polymerization process for preparing a latex preparation of a latex polymer with a core encapsulated within a shell polymer with good fix and gloss characteristics. This latex can be used for the preparation of E/A (emulsion/aggregation/coalescence) toner resins.

Processes for making E/A (emuision/aggregation/coalescence) toner resins are well known. For example, E/A (emulsion/aggregation/coalescence) processes for the preparation of toners are illustrated in a number of Xerox patents, the disclosures of each of which are totally incorporated herein by reference, such as U.S. Pat. Nos. 5,290,654, 5,278,020, 5,308,734, 5,370,963, 5,344,738, 5,403,693, 5,418,108, 5,364,729, and 5,346,797. Other patents of interest are U.S. Pat. Nos. 5,348,832; 5,405,728; 5,366,841; 5,496,676; 5,527,658; 5,585,215; 5,650,255; 5,650,256 and 5,501,935 (spherical toners).

Using the aforementioned processes, appropriate latex polymers can be formed and used to make a variety of toners for different types of imaging and printing processes, for instance, a toner with higher molecular properties for a low-volume photocopier and a toner with lower molecular properties for a high-volume photocopier. In order to obtain specific toners having particular molecular properties, the latex composition used would have to be varied and/or the $M_n$ (number average molecular weight) would have to be varied depending on the particular molecular properties required. As a result of varying the latex composition and/or $M_n$ (number average molecular weight), the Tg (glass transition temperature) of the resulting polymer would vary. Subsequently, varying Tg's (glass transition temperature) would affect toner performance by changing its properties such as toner blocking, toner crease and toner document offset.

SUMMARY OF THE INVENTION

In a feature of the present invention, there is provided a process that utilizes a standard (universal) latex composition with many of the advantages illustrated herein.

In another feature of the present invention, there is provided a process that utilizes a standard (universal) latex composition consistent with E/A (emulsion/aggregation/coalescence) toner manufacture that provides latex polymers with a wide range of molecular properties.

In still a further feature of the present invention there is provided a process that customizes a wide range $M_w$ (weight average molecular weight) latex, preferably $M_w$ (weight average molecular weight) latexes of 25,000 to 100,000, without substantially varying the $M_n$ (number average molecular weight) and, as a result, without substantially varying the Tg (glass transition temperature) such that good toner performance is maintained.

In yet another feature of the present invention, there is provided a process that produces latexes by emulsion polymerization, and especially latexes prepared by a semi-continuous emulsion polymerization, wherein wide range $M_w$ (weight average molecular weight) latexes, preferably $M_w$ (weight average molecular weight) latexes of 25,000 to 100,000, can be produced without significantly varying $M_n$ (number average molecular weight) and, as a result, without substantially varying the Tg (glass transition temperature).

In another feature of the present invention, there is provided chain-transfer agent partitioning in a semi-continuous emulsion polymerization process to customize latex polymers for E/A (emulsion/aggregation/coalescence) toner particles processing to accommodate various toner requirements. In the present invention, 'chain-transfer agent partitioning' is understood to mean that, during the process of the present invention, a monomer emulsion, comprising a certain amount of chain-transfer agent, is used in portions, wherein more chain-transfer agent is added to at least one portion of the monomer emulsion during the process.

In still another feature of the present invention, there is provided a process that utilizes chain-transfer agent partitioning to enable higher $M_w$ (weight average molecular weight) latexes without substantially varying $M_n$ (number average molecular weight).

In another feature of the present invention, there is provided a chain-transfer agent partitioning, semi-continuous emulsion polymerization process and a method for preparing toner particles wherein, for example, the latex selected is formed by emulsion polymerization which is non-ionic surfactant-free. These toners are especially useful for imaging processes, especially xerographic processes which usually prefer high toner transfer efficiency, such as those processes with a compact machine design or those that are designed to provide high quality colored images with excellent image resolution and signal-to-noise ratio, and image uniformity.

In a further feature of the present invention, there is provided a process that produces latexes, especially latexes having a core/shell morphology, by a semi-continuous, consecutive emulsion polymerization in sequence with different monomers. The resulting latexes have wide range $M_w$'s (weight average molecular weight), preferably $M_w$ (weight average molecular weight) latexes of 25,000 to 100,000, without significantly varying $M_n$ (number average molecular weight) and, as a result, without substantially varying the Tg (glass transition temperature), so that appropriate $M_n$'s (number average molecular weight), $M_w$'s (weight average molecular weight), and Tg's (glass transition temperature) are attained whereby the core polymer is for gloss and the shell polymer is for fix.

In yet another feature of the present invention, there is provided a core/shell morphology having a high $M_w$ (weight average molecular weight) core and a low $M_w$ (weight average molecular weight) shell, or vice-versa, and maintaining a substantially similar $M_n$ (number average molecular weight).

In yet another feature of the present invention, there is provided economical processes for the preparation of latexes, and black and colored toner compositions with excellent colorant, especially pigment dispersions, thus enabling the achievement of improved color print quality, and wherein the toners possess improved fusing characteristics.

In still a further feature of the present invention, there is provided a process for the preparation of toner by aggregation and coalescence, or fusion (aggregation/coalescence) of latex, pigment, and additive particles.

In embodiments, there is provided a process for the preparation of a latex polymer that comprises mixing a seed particle latex, generated by aqueous emulsion polymerization of a first portion of a monomer emulsion, with a second portion of the monomer emulsion and at least one chain-transfer agent, whereby mixing is done in the presence of a free-radical initiator and heated, and wherein the monomer emulsion comprises a mixture of polymerization reagents of at least one monomer, at least one chain-transfer agent, at least one surfactant, and water. More specifically, the at least one chain transfer agent of the monomer emulsion is, for example, of from about 10 to about 80 percent by weight of total chain transfer agent used to prepare the latex polymer and, specifically, of from about 10 to about, 40 percent by weight of total chain transfer agent used to prepare the latex polymer. The at least one chain-transfer agent mixed with the seed particle latex and the second portion of the monomer emulsion are combined and the chain-transfer agent is of from, for example, about 20 to about 90 percent by weight of total chain-transfer agent used to prepare the latex polymer, specifically, of from about 60 to about 90 percent by weight of total chain-transfer agent used to prepare the latex polymer. The total chain-transfer agent used may be of from about 0.005 to about 10 percent by weight of total monomer used to prepare the latex polymer and specifically, of from about 0.1 to about 2 percent by weight of total monomer used to prepare the latex polymer. The first portion of the monomer emulsion is, for example, of from about 0.5 to about 50 percent by weight of the monomer emulsion and, specifically, of from about 15 to about 25 percent by weight of the monomer emulsion. The mixture of polymerization reagents may further comprise at least one cross-linking agent. Preferably, during the process, oxygen is substantially excluded. The initiator is of from, for example, about 0.1 to about 10 percent by weight of the total monomer used to prepare the latex polymer and specifically, the initiator is of from about 0.6 to about 1.2 percent by weight of the total monomer used to prepare the latex polymer. Preferably, the mixing is done at of from about 35° C. to about 125° C., for example, of from about 1.5 to about 6 hours.

In embodiments, there is provided a process for the preparation of a latex polymer that comprises mixing a seed particle latex, generated by aqueous emulsion polymerization of a first portion of a monomer emulsion, with a second portion of the monomer emulsion, wherein the monomer emulsion is prepared by emulsification of a mixture of polymerization reagents of at least one monomer, at least one chain-transfer agent, at least one surfactant, and water; adding a third portion of the monomer emulsion; combining at least one chain-transfer agent with at least one of the second portion of the monomer emulsion and the third portion of the monomer emulsion; heating in the presence of a free-radical initiator to provide the latex polymer. More specifically, the at least one chain transfer agent of the monomer emulsion is, for example, of from about 10 to about 80 percent by weight of total chain transfer agent used to prepare the latex polymer and, specifically, of from about 10 to about 40 percent by weight of total chain transfer agent used to prepare the latex polymer. The at least one chain-transfer agent is combined with at least one of the second portion of the monomer emulsion and the third portion of the monomer emulsion of from, for example, about 20 to about 90 percent by weight of total chain-transfer agent used to prepare the latex polymer, specifically, of from about 60 to about 90 percent by weight of total chain-transfer agent used to prepare the latex polymer. The total chain-transfer agent used may be of from about 0.005 to about 10 percent by weight of total monomer used to prepare the latex polymer and specifically, of from about 0.1 to about 2 percent by weight of total monomer used to prepare the latex polymer. The first portion of the monomer emulsion is, for example, of from about 0.5 to about 33 percent by weight of the monomer emulsion. The second portion of the monomer emulsion is, for example, of from about 33 to about 65 percent by weight of the monomer emulsion. The mixture of polymerization reagents may further comprise at least one cross-linking agent. Preferably, during the process, oxygen is substantially excluded. The initiator is of from, for example, about 0.1 to about 10 percent by weight of the total monomer used to prepare the latex polymer and specifically, the initiator is of from about 0.6 to about 1.2 percent by weight of the total monomer used to prepare the latex polymer. Preferably, the mixing is done at of from about 35° C. to about 125° C, for example, of from about 1.5 to about 6 hours.

In embodiments, there is provided a process for the preparation of a latex polymer that comprises:

preparing a monomer emulsion by emulsification of a mixture of polymerization reagents of at least one monomer, at least one chain-transfer agent, at least one surfactant, and water, and wherein said emulsification is accomplished at a temperature of from about 5° C. to about 40° C.;

preparing a seed particle latex by aqueous emulsion polymerization of a first portion of the monomer emulsion of (i), wherein the first portion of the monomer emulsion of (i) is of from about 0.5 to about 33 percent by weight of the monomer emulsion of (i), and wherein the seed particle latex is maintained at a temperature of from about 35° C. to about 125° C.;

adding a second portion of the monomer emulsion of (i) to the seed particle latex of (ii), wherein the second portion of the monomer emulsion of (i) is of from about 33 to about 65 percent by weight of the monomer emulsion of (i);

adding a third portion of the monomer emulsion of (i) to the seed particle latex of (iii);

combining at least one chain-transfer agent, of from about 20 to about 90 percent by weight of total chain-transfer agent, with at least one of the second portion of the monomer emulsion and the third portion of the monomer emulsion;

including an initiator, of from about 0.1 to about 10 percent by weight of total monomer used to prepare the latex polymer, in at least one of (i) and (ii); and heating the combination of (i) to (vi), at a temperature of from about 35° C. to about 125° C., to provide the latex polymer.

This process may further comprise the preparation of an aqueous solution of at least one surfactant, wherein the aqueous solution is combined with the first portion of the monomer emulsion of (i) to form the seed particle latex of (ii). The surfactant, for example, is present in a range of from about 0.5 to about 15 percent by weight of total monomer used to prepare the latex polymer. Preferably, during the process, oxygen is substantially excluded.

Illustrative examples of latex polymers resulting from the processes of the present invention have a $M_w$ in the range of from about 25,000 to 100,000 and a $M_n$ in the range of from 8,000 to 12,000. Specifically, a $M_w$ in the range of from about 29,000 to 37,000 and a $M_n$ of less than 12,000.

In embodiments, there is provided a process for the preparation of a core-shell latex polymer comprising a core polymer and a shell polymer thereover and wherein the core polymer is generated by a process (A) which comprises mixing a seed particle latex, generated by aqueous emulsion polymerization of a first portion of a core monomer emulsion, with a second portion of the core monomer emulsion and at least one chain-transfer agent, whereby mixing is done in the presence of a free-radical initiator and heated to provide the core polymer, and wherein the core monomer emulsion comprises a mixture of polymerization reagents of at least one monomer, at least one chain-transfer agent, at least one surfactant, and water; (B) encapsulating the core generated polymer with a shell polymer, the shell polymer being generated by emulsion polymerization of at least one monomer in the presence of the core polymer, which emulsion polymerization comprises mixing the shell monomer emulsion, generated by emulsification of a mixture of polymerization reagents of at least one monomer, at least one chain-transfer agent, at least one surfactant, and water, with the formed core polymer, whereby mixing is done in the presence of a free-radical initiator and heated to provide the core-shell polymer. More specifically, the shell monomer emulsion may be added to the formed core polymer in at least two portions. With respect to process (A), for example, the at least one chain transfer agent of the core monomer emulsion is of from about 10 to about 80 percent by weight of total chain transfer agent used to prepare the core latex polymer and, specifically, of from about 10 to about 40 percent by weight of total chain transfer agent used to prepare the core latex polymer. The at least one chain-transfer agent mixed with the seed particle latex and the second portion of the core monomer emulsion are combined and the chain-transfer agent is of from, for example, about 20 to about 90 percent by weight of total chain-transfer agent used to prepare the core polymer, specifically, of from about 60 to about 90 percent by weight of total chain-transfer agent used to prepare the core polymer. The total chain-transfer agent used to prepare the core polymer may be of from about 0.005 to about 10 percent by weight of total monomer used to prepare the core polymer and specifically, of from about 0.1 to about 2 percent by weight of total monomer used to prepare the core polymer. The first portion of the core monomer emulsion is, for example, of from about 0.5 to about 50 percent by weight of the core monomer emulsion and, specifically, of from about 15 to about 25 percent by weight of the core monomer emulsion. With respect to process (B), the total chain-transfer agent used to prepare the shell polymer may be of from about 0.005 to about 10 percent by weight of total monomer used to prepare the shell polymer and specifically, of from about 0.1 to about 2 percent by weight of total monomer used to prepare the shell polymer. With respect to both process A and B, the mixture of polymerization reagents may further comprise at least one cross-linking agent. Preferably, during the process, oxygen is substantially excluded. Preferably, the mixing is done at of from about 35° C. to about 125° C. for example, of from about 1.5 to about 6 hours.

In embodiments, there is provided a process for the preparation of a core-shell latex polymer comprising a core polymer and a shell polymer thereover and wherein the core polymer is generated by a process (A) which comprises mixing a seed particle latex, generated by aqueous emulsion polymerization of a first portion of a core monomer emulsion, with a second portion of the core monomer emulsion, whereby mixing is done in the presence of a free-radical initiator and heated to provide the core polymer, and wherein the core monomer emulsion comprises a mixture of polymerization reagents of at least one monomer, at least one chain-transfer agent, at least one surfactant, and water; (B) encapsulating the core generated polymer with a shell polymer, the shell polymer being generated by emulsion polymerization of at least one monomer in the presence of the core polymer, which emulsion polymerization comprises mixing a first portion of the shell monomer emulsion, the shell monomer emulsion generated by emulsification of a mixture of polymerization reagents of at least one monomer, at least one chain-transfer agent, at least one surfactant, and water, with the formed core polymer; adding a second portion of the shell monomer emulsion and at least one chain-transfer agent, whereby mixing is done in the presence of a free-radical initiator and heated to provide the core-shell polymer. With respect to process (A), for example, the chain-transfer agent used to prepare the core polymer may be of from about 0.005 to about 10 percent by weight of total monomer used to prepare the core polymer and specifically, of from about 0.1 to about 2 percent by weight of total monomer used to prepare the core polymer. The first portion of the core monomer emulsion is, for example, of from about 0.5 to about 50 percent by weight of the core monomer emulsion and, specifically, of from about 15 to about 25 percent by weight of the core monomer emulsion. With respect to process (B), for example, the at least one chain transfer agent of the shell monomer emulsion is of from about 10 to about 80 percent by weight of total chain transfer agent used to prepare the shell polymer and, specifically, of from about 10 to about 40 percent by weight of total chain transfer agent used to prepare the shell polymer. The at least one chain-transfer agent with the second portion of the shell monomer emulsion are combined and the chain-transfer agent is of from, for example, about 20 to about 90 percent by weight of total chain-transfer agent used to prepare the shell polymer, specifically, of from about 60 to about 90 percent by weight of total chain-transfer agent used to prepare the shell polymer. The total chain-transfer agent used to prepare the shell polymer may be of from about 0.005 to about 10 percent by weight of total monomer used to prepare the core polymer and specifically, of from about 0.1 to about 2 percent by weight of total monomer used to prepare the shell polymer. The first portion of the shell monomer emulsion is, for example, of from about 0.5 to about 50 percent by weight of the core monomer emulsion and, specifically, of from about 15 to about 25 percent by weight of the shell monomer emulsion. With respect to both process A and B, the mixture of polymerization reagents may further comprise at least one cross-linking agent. Preferably, during the process, oxygen is substantially excluded. Preferably, the mixing is done at of from about 35° C. to about 125° C. for example, of from about 1.5 to about 6 hours.

In embodiments, there is provided a process for the preparation of a core-shell latex polymer comprising a core polymer and a shell polymer thereover and wherein the core polymer is generated by a process (A) which comprises mixing a seed particle latex, generated by aqueous emulsion polymerization of a first portion of a core monomer emulsion, with a second portion of the core monomer emulsion and at least one chain-transfer agent, whereby mixing is done in the presence of a free-radical initiator and heated to provide the core polymer, and wherein the core monomer emulsion comprises a mixture of polymerization reagents of at least one monomer, at least one chain-transfer agent, at least one surfactant, and water; (B) encapsulating the core generated polymer with a shell polymer, the shell polymer being generated by emulsion polymerization of at least one monomer in the presence of the core polymer, which emulsion polymerization comprises mixing a first portion of the shell monomer emulsion, the shell monomer emulsion generated by emulsification of a mixture of polymerization reagents of at least one monomer, at least one chain-transfer agent, at least one surfactant, and water, with the formed core polymer; adding a second portion of the shell monomer emulsion and at least one chain-transfer agent, whereby mixing is done in the presence of a free-radical initiator and heated to provide the core-shell polymer. With respect to process (A), for example, the at least one chain transfer agent of the core monomer emulsion is of from about 10 to about 80 percent by weight of total chain transfer agent used to prepare the core latex polymer and, specifically, of from about 10 to about 40 percent by weight of total chain transfer agent used to prepare the core latex polymer. The at least one chain-transfer agent mixed with the seed particle latex and the second portion of the core monomer emulsion are combined and the chain-transfer agent is of from, for example, about 20 to about 90 percent by weight of total chain-transfer agent used to prepare the core polymer, specifically, of from about 60 to about 90 percent by weight of total chain-transfer agent used to prepare the core polymer. The total chain-transfer agent used to prepare the core polymer may be of from about 0.005 to about 10 percent by weight of total monomer used to prepare the core polymer and specifically, of from about 0.1 to about 2 percent by weight of total monomer used to prepare the core polymer. The first portion of the core monomer emulsion is, for example, of from about 0.5 to about 50 percent by weight of the core monomer emulsion and, specifically, of from about 15 to about 25 percent by weight of the core monomer emulsion. With respect to process (B), for example, the at least one chain transfer agent of the shell monomer emulsion is of from about 10 to about 80 percent by weight of total chain transfer agent used to prepare the shell polymer and, specifically, of from about 10 to about 40 percent by weight of total chain transfer agent used to prepare the shell polymer. The at least one chain-transfer agent with the second portion of the shell monomer emulsion are combined and the chain-transfer agent is of from, for example, about 20 to about 90 percent by weight of total chain-transfer agent used to prepare the shell polymer, specifically, of from about 60 to about 90 percent by weight of total chain-transfer agent used to prepare the shell polymer. The total chain-transfer agent used to prepare the shell polymer may be of from about 0.005 to about 10 percent by weight of total monomer used to prepare the core polymer and specifically, of from about 0.1 to about 2 percent by weight of total monomer used to prepare the shell polymer. The first portion of the shell monomer emulsion is, for example, of from about 0.5 to about 50 percent by weight of the core monomer emulsion and, specifically, of from about 15 to about 25 percent by weight of the shell monomer emulsion. With respect to both process A and B, the mixture of polymerization reagents may further comprise at least one cross-linking agent. Preferably, during the process, oxygen is substantially excluded. Preferably, the mixing is done at of from about 35° C. to about 125° C. for example, of from about 1.5 to about 6 hours.

In embodiments, there is provided a process for the preparation of a core-shell latex polymer comprising a core polymer and a shell polymer thereover and wherein the core polymer is generated by a process (A) which comprises mixing a seed particle latex, generated by aqueous emulsion polymerization of a first portion of a core monomer emulsion, with a second portion of the core monomer emulsion, wherein the core monomer emulsion is prepared by emulsification of a mixture of polymerization reagents of at least one monomer, at least one chain-transfer agent, at least one surfactant, and water; adding a third portion of the monomer emulsion; combining at least one chain-transfer agent with at least one of the second portion of the core monomer emulsion and the third portion of the core monomer emulsion; heating in the presence of a free-radical initiator to provide the core polymer; (B) encapsulating the core generated polymer with a shell polymer, the shell polymer being generated by emulsion polymerization of at least one monomer in the presence of the core polymer, which emulsion polymerization comprises mixing the shell monomer emulsion, generated by emulsification of a mixture of polymerization reagents of at least one monomer, at least one chain-transfer agent, at least one surfactant, and water, with the formed core polymer, whereby mixing is done in the presence of a free-radical initiator and heated to provide the core-shell polymer. More specifically, the shell monomer emulsion may be added to the formed core polymer in at least two portions. With respect to process (A), for example, the at least one chain transfer agent of the core monomer emulsion is of from about 10 to about 80 percent by weight of total chain transfer agent used to prepare the core latex polymer and, specifically, of from about 10 to about 40 percent by weight of total chain transfer agent used to prepare the core latex polymer. The at least one chain-transfer agent combined with at least one of the second portion of the core monomer emulsion and the third portion of the core monomer emulsion is of from, for example, about 20 to about 90 percent by weight of total chain-transfer agent used to prepare the core polymer, specifically, of from about 60 to about 90 percent by weight of total chain-transfer agent used to prepare the core polymer. The total chain-transfer agent used to prepare the core polymer may be of from about 0.005 to about 10 percent by weight of total monomer used to prepare the core polymer and specifically, of from about 0.1 to about 2 percent by weight of total monomer used to prepare the core polymer. The first portion of the core monomer emulsion is, for example, of from about 0.5 to about 33 percent by weight of the core monomer emulsion. The second portion of the core monomer emulsion is, for example, of from about 33 to about 65 percent by weight of the core monomer emulsion. With respect to process (B), the total chain-transfer agent used to prepare the shell polymer may be of from about 0.005 to about 10 percent by weight of total monomer used to prepare the shell polymer and specifically, of from about 0.1 to about 2 percent by weight of total monomer used to prepare the shell polymer. With respect to both process A and B, the mixture of polymerization reagents may further comprise at least one cross-linking agent. Preferably, during the process, oxygen is substantially excluded. Preferably, the mixing is done at of from about 35° C. to about 125° C. for example, of from about 1.5 to about 6 hours.

In embodiments, there is provided a process for the preparation of a core-shell latex polymer comprising a core polymer and a shell polymer thereover and wherein the core polymer is generated by a process (A) which comprises mixing a seed particle latex, generated by aqueous emulsion polymerization of a first portion of a core monomer emulsion, with a second portion of the core monomer emulsion, whereby mixing is done in the presence of a free-radical initiator and heated to provide the core polymer, and wherein the core monomer emulsion comprises a mixture of polymerization reagents of at least one monomer, at least one chain-transfer agent, at least one surfactant, and water; (B) encapsulating the core generated polymer with a shell polymer, the shell polymer being generated by emulsion polymerization of at least one monomer in the presence of the core polymer, which emulsion polymerization comprises mixing a first portion of the shell monomer emulsion, the shell monomer emulsion generated by emulsification of a mixture of polymerization reagents of at least one monomer, at least one chain-transfer agent, at least one surfactant, and water, with the formed core polymer; adding a second portion of the shell monomer emulsion; adding a third portion of the shell monomer emulsion; combining at least one chain-transfer agent with at least one of the second portion of the shell monomer emulsion and the third portion of the shell monomer emulsion; heating in the presence of a free-radical initiator to provide the core-shell polymer. With respect to process (A), for example, the chain-transfer agent used to prepare the core polymer may be of from about 0.005 to about 10 percent by weight of total monomer used to prepare the core polymer and specifically, of from about 0.1 to about 2 percent by weight of total monomer used to prepare the core polymer. The first portion of the core monomer emulsion is, for example, of from about 0.5 to about 50 percent by weight of the core monomer emulsion and, specifically, of from about 15 to about 25 percent by weight of the core monomer emulsion. With respect to process (B), for example, the at least one chain transfer agent of the shell monomer emulsion is of from about 10 to about 80 percent by weight of total chain transfer agent used to prepare the shell latex polymer and, specifically, of from about 10 to about 40 percent by weight of total chain transfer agent used to prepare the shell latex polymer. The at least one chain-transfer agent combined with at least one of the second portion of the shell monomer emulsion and the third portion of the shell monomer emulsion is of from, for example, about 20 to about 90 percent by weight of total chain-transfer agent used to prepare the shell polymer, specifically, of from about 60 to about 90 percent by weight of total chain-transfer agent used to prepare the shell polymer. The total chain-transfer agent used to prepare the shell polymer may be of from about 0.005 to about 10 percent by weight of total monomer used to prepare the shell polymer and specifically, of from about 0.1 to about 2 percent by weight of total monomer used to prepare the shell polymer. The first portion of the shell monomer emulsion is, for example, of from about 0.5 to about 33 percent by weight of the shell monomer emulsion. The second portion of the shell monomer emulsion is, for example, of from about 33 to about 65 percent by weight of the shell monomer emulsion. With respect to both process A and B, the mixture of polymerization reagents may further comprise at least one cross-linking agent. Preferably, during the process, oxygen is substantially excluded. Preferably, the mixing is done at of from about 35° C. to about 125° C. for example, of from about 1.5 to about 6 hours.

In embodiments, there is provided a process for the preparation of a core-shell latex polymer comprising a core polymer and a shell polymer thereover and wherein the core polymer is generated by a process (A) which comprises mixing a seed particle latex, generated by aqueous emulsion polymerization of a first portion of a core monomer emulsion, with a second portion of the core monomer emulsion, wherein the core monomer emulsion is prepared by emulsification of a mixture of polymerization reagents of at least one monomer, at least one chain-transfer agent, at least one surfactant, and water; adding a third portion of the monomer emulsion; combining at least one chain-transfer agent with at least one of the second portion of the core monomer emulsion and the third portion of the core monomer emulsion; heating in the presence of a free-radical initiator to provide the core polymer; (B) encapsulating the core generated polymer with a shell polymer, the shell polymer being generated by emulsion polymerization of at least one monomer in the presence of the core polymer, which emulsion polymerization comprises mixing a first portion of the shell monomer emulsion, the shell monomer emulsion generated by emulsification of a mixture of polymerization reagents of at least one monomer, at least one chain-transfer agent, at least one surfactant, and water, with the formed core polymer; adding a second portion of the shell monomer emulsion; adding a third portion of the shell monomer emulsion; combining at least one chain-transfer agent with at least one of the second portion of the shell monomer emulsion and the third portion of the shell monomer emulsion; heating in the presence of a free-radical initiator to provide the core-shell polymer. With respect to process (A), for example, the at least one chain transfer agent of the core monomer emulsion is of from about 10 to about 80 percent by weight of total chain transfer agent used to prepare the core latex polymer and, specifically, of from about 10 to about 40 percent by weight of total chain transfer agent used to prepare the core latex polymer. The at least one chain-transfer agent combined with at least one of the second portion of the core monomer emulsion and the third portion of the core monomer emulsion is of from, for example, about 20 to about 90 percent by weight of total chain-transfer agent used to prepare the core polymer, specifically, of from about 60 to about 90 percent by weight of total chain-transfer agent used to prepare the core polymer. The total chain-transfer agent used to prepare the core polymer may be of from about 0.005 to about 10 percent by weight of total monomer used to prepare the core polymer and specifically, of from about 0.1 to about 2 percent by weight of total monomer used to prepare the core polymer. The first portion of the core monomer emulsion is, for example, of from about 0.5 to about 33 percent by weight of the core monomer emulsion. The second portion of the core monomer emulsion is, for example, of from about 33 to about 65 percent by weight of the core monomer emulsion. With respect to process (B), for example, the at least one chain transfer agent of the shell monomer emulsion is of from about 10 to about 80 percent by weight of total chain transfer agent used to prepare the shell latex polymer and, specifically, of from about 10 to about 40 percent by weight of total chain-transfer agent used to prepare the shell latex polymer. The at least one chain-transfer agent combined with at least one of the second portion of the shell monomer emulsion and the third portion of the shell monomer emulsion is of from, for example, about 20 to about 90 percent by weight of total chain-transfer agent used to prepare the shell polymer, specifically, of from about 60 to about 90 percent by weight of total chain-transfer agent used to prepare the shell polymer. The total chain-transfer agent used to prepare the shell polymer may be of from about 0.005 to about 10 percent by weight of total monomer used to prepare the shell polymer and specifically, of from about 0.1 to about 2 percent by weight of total monomer used to prepare the shell polymer. The first portion of the shell monomer emulsion is, for example, of from about 0.5 to about 33 percent by weight of the shell monomer emulsion. The second portion of the shell monomer emulsion is, for example, of from about 33 to about 65 percent by weight of the shell monomer emulsion. With respect to both process A and B, the mixture of polymerization reagents may further comprise at least one cross-linking agent. Preferably, during the process, oxygen is substantially excluded. Preferably, the mixing is done at of from about 35° C. to about 125° C. for example, of from about 1.5 to about 6 hours.

In embodiments, there is provided a process for the preparation of a latex comprising a core polymer and a shell polymer thereover and wherein the core polymer is generated by a process (A) which comprises:

preparing a core monomer emulsion by emulsification of a mixture of polymerization reagents of at least one monomer, at least one chain-transfer agent, at least one surfactant, and water;

preparing a seed particle latex by aqueous emulsion polymerization of a first portion of the core monomer emulsion of (i);

adding a second portion of the core monomer emulsion of (i) and at least one chain-transfer agent to the seed particle latex of (ii);

including a free-radical initiator in at least one of (i) and (ii); and heating the mixture obtained from (ii) to (iv) to provide the core polymer; and (B) encapsulating the core generated polymer with a shell polymer, the shell polymer being generated by emulsion polymerization of at least one monomer in the presence of the core polymer, which emulsion polymerization comprises:

preparing a shell monomer emulsion by emulsification of a mixture of polymerization reagents of at least one monomer, at least one chain-transfer agent, at least one surfactant, and water;

adding to the formed core polymer, the shell monomer emulsion of (i);

including a free-radical initiator in at least one (i) and (ii); and heating the mixture obtained from (ii) to (iii), whereby there is provided a core-shell polymer.

In embodiments, there is provided a process for the preparation of a latex comprising a core polymer and a shell thereover and Wherein the core polymer is generated by a process (A) which comprises:

preparing a core monomer emulsion by emulsification of a mixture of polymerization reagents of at least one monomer, at least one chain-transfer agent, at least one surfactant, and water;

preparing a seed particle latex by aqueous emulsion polymerization of a first portion of the core monomer emulsion of (i);

adding a second portion of the core monomer emulsion of (i) to the seed particle latex of (ii);

including a free-radical initiator in at least one of (i) and (ii); and heating the mixture obtained from (ii) to (iv) to provide the core polymer; and (B) encapsulating the core generated polymer with a shell polymer, the shell polymer being generated by emulsion polymerization of at least one monomer in the presence of the core polymer, which emulsion polymerization comprises:

preparing a shell monomer emulsion by emulsification of a mixture of polymerization reagents of at least one monomer, at least one chain-transfer agent, at least one surfactant, and water;

adding to the formed core polymer, a first portion of the shell monomer emulsion of (i);

adding a second portion of the shell monomer emulsion of (i) and at least one chain-transfer agent to the core polymer of (ii);

including a free-radical initiator in at least one of (i) and (ii);

heating the mixture obtained from (ii) to (iv), whereby there is provided a core-shell polymer.

In embodiments, there is provided a process for the preparation of a latex comprising a core polymer and a shell thereover and wherein the core polymer is generated by a process (A) which comprises:

preparing a core monomer emulsion by emulsification of a mixture of polymerization reagents of at least one monomer, at least one chain-transfer agent, at least one surfactant, and water;

preparing a seed particle latex by aqueous emulsion polymerization of a first portion of the core monomer emulsion of (i);

adding a second portion of the core monomer emulsion of (i) and at least one chain-transfer agent to the seed particle latex of (ii);

including a free-radical initiator in at least one of (i) and (ii); and heating the mixture obtained from (ii) to (iv) to provide the core polymer; and (B) encapsulating the core generated polymer with a shell polymer, the shell polymer being generated by emulsion polymerization of at least one monomer in the presence of the core polymer, which emulsion polymerization comprises:

preparing a shell monomer emulsion by emulsification of a mixture of polymerization reagents of at least one monomer, at least one chain-transfer agent, at least one surfactant, and water;

adding to the formed core polymer, a first portion of the shell monomer emulsion of (i);

adding a second portion of the shell monomer emulsion of (i) and at least one chain-transfer agent to the core polymer of (ii);

including a free-radical initiator in at least one of (i) and (ii);

heating the mixture obtained from (ii) to (iv), whereby there is provided a core-shell polymer.

In embodiments, there is provided a process for the preparation of a latex comprising a core polymer and a shell polymer thereover and wherein the core polymer is generated by a process (A) which comprises:

preparing a core monomer emulsion by emulsification of a mixture of polymerization reagents of at least one monomer, at least one chain-transfer agent, at least one surfactant, and water;

preparing a seed particle latex by aqueous emulsion polymerization of a first portion of the core monomer emulsion of (i);

adding a second portion of the core monomer emulsion of (i) to the seed particle latex of (ii);

adding a third portion of the core monomer emulsion of (i) to the seed particle latex of (iii);

including at least one chain-transfer agent in at least one of (iii) and (iv);

including a free-radical initiator in at least one of (i) and (ii); and heating the mixture obtained from (ii) to (vi) to provide the core polymer; and (B) encapsulating the core generated polymer with a shell polymer, the shell polymer being generated by emulsion polymerization of at least one monomer in the presence of the core polymer, which emulsion polymerization comprises:

preparing a shell monomer emulsion by emulsification of a mixture of polymerization reagents of at least one monomer, at least one chain-transfer agent, at least one surfactant, and water;

adding to the formed core polymer, the shell monomer emulsion of (i);

including a free-radical initiator in at least one of (i) and (ii); and heating the mixture obtained from (ii) to (iii), whereby there is provided a core-shell polymer.

In embodiments, there is provided a process for the preparation of a latex comprising a core polymer and a shell thereover and wherein the core polymer is generated by a process (A) which comprises:

preparing a core monomer emulsion by emulsification of a mixture of polymerization reagents of at least one monomer, at least one chain-transfer agent, at least one surfactant, and water;

preparing a seed particle latex by aqueous emulsion polymerization of a first portion of the core monomer emulsion of (i);

adding a second portion of the core monomer emulsion of (i) to the seed particle latex of (ii);

including a free-radical initiator in at least one of (i) and (ii); and heating the mixture obtained from (ii) to (iv) to provide the core polymer; and (B) encapsulating the core generated polymer with a shell polymer, the shell polymer being generated by emulsion polymerization of at least one monomer in the presence of the core polymer, which emulsion polymerization comprises:

preparing a shell monomer emuision by emulsification of a mixture of polymerization reagents of at least one monomer, at least one chain-transfer agent, at least one surfactant, and water;

adding to the formed core polymer, a first portion of the shell monomer emulsion of (i);

adding a second portion of the shell monomer emulsion of (i) to the core polymer of (ii);

adding a third portion of the shell monomer emulsion of (i) to the core polymer of (iii);

including at least one chain transfer agent in at least one of (iii) and (iv);

including a free-radical initiator in at least one of (i) and (ii);

heating the mixture obtained from (ii) to (vi), whereby there is provided a core-shell polymer.

In embodiments, there is provided a process for the preparation of a latex comprising a core polymer and a shell thereover and wherein the core polymer is generated by a process (A) which comprises:

preparing a core monomer emulsion by emulsification of a mixture of polymerization reagents of at least one monomer, at least one chain-transfer agent, at least one surfactant, and water;

preparing a seed particle latex by aqueous emulsion polymerization of a first portion of the core monomer emulsion of (i);

adding a second portion of the core monomer emulsion of (i) to the seed particle latex of (ii);

adding a third portion of the core monomer emulsion of (i) to the seed particle latex of (iii);

including at least one chain-transfer agent in at least one of (iii) and (iv);

including a free-radical initiator in at least one of (i) and (ii); and heating the mixture obtained from (ii) to (vi) to provide the core polymer; and (B) encapsulating the core generated polymer with a shell polymer, the shell polymer being generated by emulsion polymerization of at least one monomer in the presence of the core polymer, which emulsion polymerization comprises:

preparing a shell monomer emulsion by emulsification of a mixture of polymerization reagents of at least one monomer, at least one chain-transfer agent, at least one surfactant, and water;

adding to the formed core polymer, a first portion of the shell monomer emulsion of (i);

adding a second portion of the shell monomer emulsion of (i) to the core polymer of (ii);

adding a third portion of the shell monomer emulsion of (i) to the core polymer of (iii);

including at least one chain transfer agent in at least one of (iii) and (iv);

including a free-radical initiator in at least one of (i) and (ii);

heating the mixture obtained from (ii) to (vi), whereby there is provided a core-shell polymer.

Illustrative examples of the resulting core-shell polymer of the processes of the present invention have a core polymer with a molecular weight in the range of from about 5,000 to 30,000, specifically, of from about 8,000 to about 25,000, and a Tg of from about 20 to about 50° C., specifically, of from about 30° C. to about 50° C., and a shell polymer with a molecular weight in the range of from about 40,000 to 200,000 and a Tg of from about 50 to about 70° C., specifically of from about 55° C. to about 65° C. In other examples, the core-shell polymer comprises core polymer of from about 10 to 60 percent by weight based on core-shell polymer, more specifically of from about 20 to 50 percent by weight based on core-shell polymer, and shell polymer of from about 40 to 90 percent by weight based on core-shell polymer and, more specifically, of from about 50 to 80 percent by weight based on core-shell polymer. The polymeric shell has a thickness of, for example, about 0.01 microns to about 0.3 microns, and specifically of from about 0.03 microns to about 0.2 microns.

Illustrative examples of crosslinking agents selected for the processes of the present invention are divinyl benzene, divinyl toluene, diacrylates, and dimethacrylates.

Illustrative examples of chain-transfer agents selected for the processes of the present invention are dodecanethiol, butanethiol, isooctyl-3-mercaptopropionate (IOMP), 2-methyl-5-t-butylthio-phenol, carbon tetrachloride, and carbon tetrabromide.

Illustrative examples of surfactants selected for the processes of the present invention are ionic surfactants, specifically, anionic examples such as an ionic surfactant such as a sulfonate of the formula:

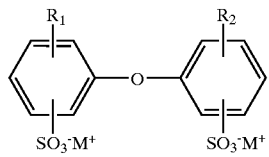

Especially, sodium tetrapropyl diphenyloxide disulfonate, sodium n-decyl diphenyloxide disulfonate, sodium hexyl diphenyloxide disulfonate, sodium n-decyl diphenyloxide disulfonate, sodium n-dodecyl diphenyloxide disulfonate, sodium n-hexadecyl diphenyloxide disulfonate and sodium palmityl diphenyloxide disulfonate. More specifically, DOWFAX 2A1™, DOWFAX 3A2™, DOWFAX 8390™, RHODACAL DSB™, POLY-TERGENT 2A1™, POLY-TERGENT 2EP™, AEROSOL DPOS-45™, CALFAX DBA-40™, and CALFAX 16L-35™.

Illustrative examples of at least one monomer selected for the processes of the present invention are acrylic and methacrylic esters, styrene, vinyl esters of aliphatic acids, ethylenically unsaturated carboxylic acids (eg. acrylic acid, methacrylic acid, itaconic acid, maleic acid, fumaric acid, 2-carboxyethyl acrylate ($\beta$,-CEA) and mixtures thereof), cross-linking agents and mixtures thereof.

Illustrative examples of latex polymers selected for the product of the processes of the present invention are poly(styrene-butadiene), poly(methyl methacrylate-butadiene), poly(ethyl methacrylate-butadiene), poly(propyl methacrylate-butadiene), poly(butyl methacrylate-butadiene), poly(styrene-isoprene), poly(methyl methacrylate-isoprene), poly(ethyl methacrylate-isoprene), poly(propyl methacrylate-isoprene), poly(butyl methacrylate-isoprene), poly(styrene-propyl acrylate), poly(styrene-butyl acrylate), poly(styrene-2-ethylhexyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-2-ethylhexyl acrylate-acrylic acid), poly(styrene-butyl acrylate-methacrylic acid), poly(styrene-2-ethylhexyl acrylate-methacrylic acid), poly(styrene-butyl acrylate-acrylononitrile), and poly(styrene-butyl acrylate-acrylononitrile-acrylic acid), poly(methyl methacrylate-propyl acrylate), poly(methyl methacrylate-butyl acrylate), poly(methyl methacrylate-butadiene-acrylic acid), poly(methyl methacrylate-butadiene-methacrylic acid), poly(methyl methacrylate-butadiene-acrylonitrile-acrylic acid), poly(methyl methacrylate-butyl acrylate-acrylic acid), poly(methyl methacrylate-butyl acrylate-methacrylic acid), poly(methyl methacrylate-butyl acrylate-acrylononitrile), and poly(styrene-butyl acrylate-acrylononitrile-acrylic acid), and the preferred polymers for the shell include poly(styrene-butadiene), poly(methyl methacrylate-butadiene), poly(styrene-isoprene), poly(methyl methacrylate-isoprene), poly(ethyl methacrylate-isoprene), poly(butyl methacrylate-isoprene), poly(styrene-propyl acrylate), poly(styrene-butyl acrylate), poly(styrene-2-ethylhexyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-2-ethylhexyl acrylate-acrylic acid), poly(styrene-butyl acrylate-methacrylic acid), poly(styrene-2-ethylhexyl acrylate-methacrylic acid), poly(styrene-butyl acrylate-acrylononitrile), and poly(styrene-butyl acrylate-acrylononitrile-acrylic acid), poly(methyl methacrylate-propyl acrylate), poly(methyl methacrylate-butyl acrylate), poly(methyl methacrylate-butadiene-acrylic acid), poly(methyl methacrylate-butadiene-methacrylic acid), poly(methyl methacrylate-butadiene-acrylonitrile-acrylic acid), poly(methyl methacrylate-butyl acrylate-acrylic acid), poly(methyl methacrylate-butyl acrylate-methacrylic acid), poly(methyl methacrylate-butyl acrylate-acrylononitrile), and poly(styrene-butyl acrylate-acrylononitrile-acrylic acid).

Illustrative examples of core and shell polymers selected for the product of the processes of the present invention are poly(styrene-butadiene), poly(methyl methacrylate-butadiene), poly(ethyl methacrylate-butadiene), poly(propyl methacrylate-butadiene), poly(butyl methacrylate-butadiene), poly(styrene-isoprene), poly(methyl methacrylate-isoprene), poly(ethyl methacrylate-isoprene), poly(propyl methacrylate-isoprene), poly(butyl methacrylate-isoprene), poly(styrene-propyl acrylate), poly(styrene-butyl acrylate), poly(styrene-2-ethylhexyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-2-ethylhexyl acrylate-acrylic acid), poly(styrene-butyl acrylate-methacrylic acid), poly(styrene-2-ethyl hexyl acrylate-methacrylic acid), poly(styrene-butyl acrylate-acrylononitrile), and poly(styrene-butyl acrylate-acrylononitrile-acrylic acid), poly(methyl methacrylate-propyl acrylate), poly(methyl methacrylate-butyl acrylate), poly(methyl methacrylate-butadiene-acrylic acid), poly(methyl methacrylate-butadiene-methacrylic acid), poly(methyl methacrylate-butadiene-acrylonitrile-acrylic acid), poly(methyl methacrylate-butyl acrylate-acrylic acid), poly(methyl methacrylate-butyl acrylate-methacrylic acid), poly(methyl methacrylate-butyl acrylate-acrylononitrile), and poly(styrene-butyl acrylate-acrylononitrile-acrylic acid), and the preferred polymers for the shell include poly(styrene-butadiene), poly(methyl methacrylate-butadiene), poly(styrene-isoprene), poly(methyl methacrylate-isoprene), poly(ethyl methacrylate-isoprene), poly(butyl methacrylate-isoprene), poly(styrene-propyl acrylate), poly(styrene-butyl acrylate), poly(styrene-2-ethylhexyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-2-ethylhexyl acrylate-acrylic acid), poly(styrene-butyl acrylate-methacrylic acid), poly(styrene-2-ethylhexyl acrylate-methacrylic acid), poly(styrene-butyl acrylate-acrylononitrile), and poly(styrene-butyl acrylate-acrylononitrile-acrylic acid), poly(methyl methacrylate-propyl acrylate), poly(methyl methacrylate-butyl acrylate), poly(methyl methacrylate-butadiene-acrylic acid), poly(methyl methacrylate-butadiene-methacrylic acid), poly(methyl methacrylate-butadiene-acrylonitrile-acrylic acid), poly(methyl methacrylate-butyl acrylate-acrylic acid), poly(methyl methacrylate-butyl acrylate-methacrylic acid), poly(methyl methacrylate-butyl acrylate-acrylononitrile), and poly(styrene-butyl acrylate-acrylononitrile-acrylic acid).

In embodiments, there is provided a process for the preparation of toner that comprises aggregating a colorant dispersion with the latex polymer, prepared according to the present invention, and coalescing or fusing the aggregates generated. Preferably, the aggregating step is done at a temperature below or equal to about the latex polymer glass transition temperature, specifically, of from about 25° C. to about 60° C., the coalescing or fusing of said aggregates is above or equal to about the latex polymer glass transition temperature, specifically, of from about 60° C. to about 100° C. The resulting toner size is preferably of from about 2 to about 20 microns, more preferably of from about 2 to about 10 microns, in volume average diameter.

In embodiments, there is provided a process for the preparation of toner that comprises aggregating a colorant dispersion with the core-shell polymer, prepared according to the present invention, and coalescing or fusing the aggregates generated. Preferably, the aggregating step is done at a temperature below or equal to about the core or shell polymer glass transition temperature, specifically, of from about 25° C. to about 60° C., the coalescing or fusing of said aggregates is above or equal to about the core or shell polymer glass transition temperature, specifically, of from about 60° C. to about 100° C.. The resulting toner size is preferably of from about 2 to about 20 microns, more preferably of from about 2 to about 10 microns, in volume average diameter.

DETAILED DESCRIPTION

The present invention relates to a chain-transfer agent partitioning, emulsion polymerization process that utilizes a standard (universal) latex composition to produce latex polymers having a wide range of molecular properties and which can be selected for various E/A (emulsion/aggregation/coalescence) processes, as illustrated in patents hereinbefore, for forming toner resins.

While any suitable emulsion process may be used in the present invention, preferably a seed polymerization method is utilized. That is, the polymerization of the monomer of the emulsion is conducted by first forming a seed particle latex from a portion of the emulsion and at least one free-radical initiator, and subsequently adding a remaining portion of the emulsion, optionally with additional free-radical initiator, to the seed particle latex. The use of a seed particle latex significantly reduces batch-to-batch variations in the emulsion polymerization process. Also, in situ seed formation at the beginning of a reaction is simplified since no additional reactor is needed to formulate the seed particle latexes.

In an embodiment of the invention, the emulsion polymerization process for the preparation of latex polymers of the present invention comprises an in situ seeded, monomer emulsion addition, chain-transfer agent partitioning, semi-continuous polymerization, wherein a part of the chain-transfer agent is added at one phase of the process and another part of the chain-transfer agent is added at another phase in the process.

In further embodiments, the present invention relates to an oxygen-free polymerization process. The exclusion of oxygen in an emulsion polymerization process ensures latex reproducibility, especially in manufacturing scale-up, since oxygen can interact with the chain-transfer agent and inhibit polymerization. Preferred purging gases are argon and nitrogen.

In embodiments, the process for making a latex polymer is done by mixing a seed particle latex, which is generated by aqueous emulsion polymerization of a first portion of a monomer emulsion, with a second portion of the monomer emulsion and at least one chain-transfer agent. The mixing is done in the presence of a free-radical initiator and heat. The monomer emulsion used comprises a mixture of polymerization reagents of at least one monomer, at least one chain-transfer agent, at least one surfactant, and water.

In a preferred embodiment of the invention, a latex polymer is made by first forming a monomer emulsion. Firstly, the monomer emulsion is prepared by emulsification of a mixture of polymerization reagents of at least one monomer, at least one chain-transfer agent, at least one surfactant, and water. Emulsification may be done by any suitable process, for example, high speed mixing at low temperatures. For instance, the mixture may be mixed in a homogenizer set at about 5,000 to about 25,000 rpm at about about 5° C. to about 40° C. for a sufficient period of time, which is typically of from about 30 seconds to about 30 minutes. Secondly, a seed particle latex is prepared by aqueous emulsion polymerization of one portion of the monomer emulsion and at least one free-radical initiator. Preferably, one portion of the monomer emulsion and at least one free radical initiator is charged to a reactor which already has been charged with an aqueous solution of at least one surfactant of from about 0.5 to about 15 percent by weight of total monomer used to prepare the latex polymer. Thirdly, subsequent to formation of the seed particle latex, a remaining portion of the monomer emulsion is combined with at least one chain-transfer agent and added to the reactor to obtain the latex polymer.

The emulsion polymerization process is preferably conducted in a semi-continuous manner, and which may include the known starve fed method as described in U.S. Pat. No. 5,444,140, the disclosure of which is totally incorporated herein by reference in its entirety. In particular, the remaining portion of the monomer emulsion is slowly added to the reactor over a period of time in forming the latex polymer; the monomer in the reaction is consumed by polymerization at about the same rate as it is added. For example, the remaining portion may be added to the reactor at a rate of from about 0.1 gram per kilogram of reactor content per minute to about 50 grams per kilogram of reactor content per minute, wherein all will be charged in about 90 minutes. Such semi-continuous polymerization techniques are preferred over batch emulsion polymerization techniques in the preparation of E/A (emulsion/aggregation/coalescence) toner resins as such techniques offer (1) better control of heat management during the exothermic polymerization process, especially in large-scale production; (2) more control opportunities for particle size, particle stability, molecular weight and surface properties; (3) preservation of a more homogeneous composition for the latexes; and (4) the opportunity to create core-shell polymers by changing the final monomer composition or co-monomer ratio.

The number of portions used of the monomer emulsions described herein can be at least two portions.

The mixture of polymerization reagents used to form the monomer emulsion can further comprise at least one cross-linking agent.

The at least one surfactant is preferably present in the emulsion in an amount of from about 0.1% to about 10%, more preferably of from about 0.6% to about 1.2%, by weight of the total monomer used to prepare the latex polymer.

Preferably, one portion of the monomer emulsion used to make the seed particle latex is of from about 0.5 to about 50 percent by weight of the total monomer emulsion used to prepare the latex polymer and more preferably, of from about 15 to about 25 percent by weight of the total monomer emulsion used to prepare the latex polymer. When particularly low weight percentages of one portion of the monomer emulsion are used, this process is preferably carried out on a smaller scale, for example, a bench-scale or a smaller plant-scale, as this particular embodiment of the process is highly exothermic. If this process was to be carried out on a larger scale, a cooling means, such as a cooling jacket for a reactor used for such a process, may be required.

The at least one chain-transfer agent of the monomer emulsion may be present of from about 10 to about 80 percent by weight of total chain-transfer agent used to prepare the latex polymer, and preferably, of from about 10 to 40 percent by weight.

The at least one chain-transfer agent added to the remaining monomer emulsion may be present of from about 20 to about 90 percent by weight of total chain-transfer agent used to prepare the latex polymer, and preferably, of from about 60 to 90 percent by weight. If desired, the chain-transfer agent may be separately added during the addition phase of the remaining monomer emulsion.

The total chain-transfer agent used to prepare the latex polymer may be used in any effective amount, such as from about 0.005 to about 10 percent by weight of the total monomer used to prepare the latex polymer, preferably, from about 0.1 to about 2 percent by weight.

The free-radical initiator is preferably of from about 0.1 to about 10 percent by weight of total monomer used to prepare the latex polymer. Most preferably, the initiator is present of from about 0.1 to about 5 percent by weight. In other embodiments, the initiator may also be added at various phases in the process. For instance, the initiator could be added to the initial monomer emulsion and/or to one portion of the monomer emulsion. Also, the initiator could be added to the initial monomer emulsion and/or to one portion of the monomer emulsion, and to the remaining monomer emulsion. The amount of the free-radical initiator added at a particular phase in the process may be from about 30% to 100% by weight, preferably from about 50% to 100% by weight, and most preferably 100% by weight of the total amount of free radical initiator used to prepare the latex resin. Prior to addition, the temperature of the materials in the reactor is brought to, preferably, about 35° C. to about 125° C., which temperature is maintained during addition of the free-radical initiator. Preferably, the initiator is added only to one portion of the monomer emulsion.

The first, second and third phases of the process are, preferably, accomplished at a temperature of from about 5° C. to about 40° C.; of from about 35° C. to about 125° C.; and of from about 35° C. to about 125° C.; respectively.

Preferably, the temperature, as discussed above for formation of the seed latex is maintained during formation of the subsequent latex polymer. More preferably, stirring is maintained thereafter, for example, of from about 10 to about 1,000 rpm.

The reactor is preferably heated for about 0.5 to about 14 hours, and more preferably, 1.5 to about 6 hours.

In another preferred embodiment of the invention, a latex polymer is made by first forming a monomer emulsion. Firstly, the monomer emulsion is prepared by emulsification of a mixture of polymerization reagents of at least one monomer, at least one chain-transfer agent, at least one surfactant, and water. Emulsification may be done by any suitable process, for example, high speed mixing at low temperatures. For instance, the mixture may be mixed in a homogenizer set at about 5,000 to about 25,000 rpm at about about 5° C. to about 40° C. for a sufficient period of time, which is typically of from about 30 seconds to about 30 minutes. Secondly, a seed particle latex is prepared by aqueous emulsion polymerization of one portion of the monomer emulsion and at least one free-radical initiator. Preferably, one portion of the monomer emulsion and at least one free radical initiator is charged to a reactor which already has been charged with an aqueous solution of at least one surfactant of from about 0.5 to about 15 percent by weight of total monomer used to prepare the latex polymer. Thirdly, subsequent to formation of the seed particle latex, a second portion of the monomer emulsion is added to the reactor. Fourthly, a remaining portion of the monomer emulsion is added to the reactor and at least one chain-transfer agent is added to at least one of the second portion of the monomer emulsion and the remaining portion of the monomer emulsion to yield the latex polymer.

The emulsion polymerization process is most preferably conducted in a semi-continuous manner, and which may include the known starve fed method as described in U.S. Pat. No. 5,444,140. In particular, the second and remaining portions of the monomer emulsion are slowly added to the reactor over a period of time in forming the latex polymer; the monomer in the reaction is consumed by polymerization at about the same rate as it is added. For example, the second and remaining portions may each be added to the reactor at a rate of from about 0.1 gram per kilogram of reactor content per minute to about 50 grams per kilogram of reactor content per minute, wherein all will be charged in about 90 minutes.

This embodiment is less exothermic and, as a result, may be carried out on both a smaller scale, for example, a bench-scale or a smaller plant-scale, and a larger scale.

The mixture of polymerization reagents used to form the monomer emulsion can further comprise at least one cross-linking agent.

The at least one surfactant is preferably present in the emulsion in an amount of from about 0.1% to about 10%, more preferably, of from about 0.6% to about 1.2%, by weight of the total monomer used to prepare the latex polymer.

Preferably, one portion of the monomer emulsion used to make the seed particle latex is of from about 0.5 to about 33 percent by weight of the total monomer emulsion, more preferably, of from about 0.5 to about 5 percent by weight and most preferably, 1 percent by weight.

Preferably, the second portion of the monomer emulsion is of from about 33 to about 65 percent by weight of the total monomer emulsion and more preferably, 50 percent by weight.

Most preferably, one portion of the monomer emulsion used to make the seed particle latex is 1 percent by weight of the monomer emulsion and the second portion of the monomer emulsion is 50 percent by weight of the monomer emulsion.

The at least one chain-transfer agent of the monomer emulsion may be present of from about 10 to about 80 percent by weight of total chain-transfer agent used to prepare the latex polymer, and preferably, of from about 10 to 40 percent by weight.

The at least one chain-transfer agent added to the second and/or remaining monomer emulsion may be present of from about 20 to about 90 percent by weight of total chain-transfer agent used to prepare the latex polymer, and preferably, of from about 60 to 90 percent by weight. If desired, the chain-transfer agent may be separately added during the addition phase of the second and/or remaining monomer emulsion. Preferably, the at least one chain-transfer agent is added only to the remaining monomer emulsion.

The total chain-transfer agent may be used in any effective amount, such as from about 0.005 to about 10 percent by weight of the total monomer used to prepare the latex polymer, preferably, from about 0.1 to about 2 percent by weight.

The free-radical initiator is preferably of from about 0.1 to about 10 percent by weight of total monomer used to prepare the latex polymer. Most preferably, the initiator is present of from about 0.1 to about 5 percent by weight. In other embodiments, the initiator may also be added at various phases in the process. For instance, the initiator could be added to the initial monomer emulsion and/or to one portion of the monomer emulsion. Also, the initiator could be added to the initial monomer emulsion and/or to one portion of the monomer emulsion, and to the second portion of the monomer emulsion and/or to the remaining monomer emulsion. The amount of the free-radical initiator added at a particular phase in the process may be from about 30% to 100% by weight, preferably from about 50% to 100% by weight, and most preferably 100% by weight of the total amount of free radical initiator used to prepare the latex resin. Prior to addition, the temperature of the materials in the reactor is brought to, preferably, about 35° C. to about 125° C., which temperature is maintained during addition of the free-radical initiator. Preferably, the initiator is added only to one portion of the monomer emulsion.

The first, second, third and fourth phases are, preferably, accomplished at a temperature of from about 5° C. to about 40° C.; of from about 35° C. to about 125° C.; of from about 35° C. to about 125° C.; and of from about 35° C. to about 125° C.; respectively.

Preferably, the temperature, as discussed above for formation of the seed latex, is maintained during formation of the subsequent latex polymer. More preferably, stirring is maintained thereafter, for example, of from about 10 to about 1,000 rpm.

The reactor is preferably heated for about 0.5 to about 14 hours, and more preferably, 1.5 to about 6 hours.

In another preferred embodiment of the invention, a latex polymer is made by first forming a monomer emulsion. Firstly, the monomer emulsion is prepared by high speed mixing, of from about 5,000 to about 25,000 rpm and at a temperature of from about 5° C. to about 40° C., a mixture of polymerization reagents of at least one monomer, at least one chain-transfer agent, of from about 10 to about 40 percent by weight of total chain-transfer agent, at least one surfactant, and water. The monomer emulsion is mixed for of from about 30 seconds to about 30 minutes. Secondly, a seed particle latex is prepared at a temperature of from about 35° C. to about 125° C. by charging one portion of the monomer emulsion, of from about 0.5 to about 33 percent by weight of the total monomer emulsion, and an aqueous solution of at least one free-radical initiator, of from about 30 to 100 percent by weight of the total amount of free-radical initiator used to prepare the latex resin, to a reactor already charged with an aqueous solution of at least one surfactant of from about 0.5 to about 15 percent by weight of total monomer used to prepare the latex polymer. This seed polymerization reaction is stirred continuously at of from about 10 to 1000 rpm to allow seed particle latex formation. The temperature and stirring is maintained, and thirdly, subsequent to formation of the seed particle latex, a second portion of the monomer emulsion is added to the reactor, semi-continuously over a period of time. The second portion is of from about 33 to about 65 percent by weight of the total monomer emulsion. Fourthly, a remaining portion of the monomer emulsion and at least one chain-transfer agent, of from about 60 to about 90 percent by weight of total chain-transfer agent, is added to the reactor. The second and remaining portions are each added to the reactor at a rate of from about 0.1 gram per kilogram of reactor content per minute to about 50 grams per kilogram of reactor content per minute, wherein all will be charged in about 90 minutes. The final mixture is heated and stirred at a temperature of from about 35° C. to about 125° C., for of from about 1.5 to 6 hours and cooled to provide the latex polymer. During the process, the system was purged with nitrogen.

Another embodiment of the present invention relates to a chain-transfer agent partitioning, semi-continuous emulsion polymerization process for the preparation of core-shell latex polymers for use in the preparation of toner compositions. While the word "shell" is used, it is understood that the word "shell" could include coatings, covers and the like. The general aforementioned processes described above may be applied to a process for forming core-shell latex polymers. In one particular embodiment, the core polymer is formed by chain-transfer partitioning emulsion polymerization of a first-stage monomer composition, wherein a part of the chain-transfer agent is added at one phase of the core process and the remaining part of the chain-transfer agent is added at another phase in the core process. The shell encapsulates the core by chain-transfer partitioning emulsion polymerization of a second-stage monomer composition, preferably, in the presence of the core polymer, wherein a part of the chain-transfer agent is added at one phase of the shell process and the remaining part of the chain-transfer agent is added at another phase in the shell process. In a further embodiment, the core is formed by chain-transfer partitioning emulsion polymerization of a first-stage monomer composition, wherein a part of the chain-transfer agent is added at one phase of the core process and the remaining part of the chain-transfer agent is added at another phase in the core process, and the shell encapsulates the core by emulsion polymerization, described in patents referenced herein, of a second-stage monomer composition, preferably, in the presence of the core polymer. In yet a further embodiment, the core is formed by emulsion polymerization, described in patents referenced herein, of a first-stage monomer composition and the shell encapsulates the core by chain-transfer partitioning emulsion polymerization of a second-stage monomer composition, preferably, in the presence of the core polymer, wherein a part of the chain-transfer agent is added at one phase of the shell process and the remaining part of the chain-transfer agent is added at another phase in the shell process. More preferably, these embodiments are directed to core-shell latexes prepared by semi-continuous emulsion polymerization using chain-transfer agent partitioning, as described herein.

In a preferred embodiment of the invention, (A) a core polymer is made by first forming a core monomer emulsion. Firstly, the core monomer emulsion is prepared by emulsification of a mixture of polymerization reagents of at least one monomer, at least one chain-transfer agent, at least one surfactant, and water. Emulsification may be done by any suitable process, for example, high speed mixing at low temperatures. For instance, the mixture may be mixed in a homogenizer set at about 5,000 to about 25,000 rpm at about about 5° C. to about 40° C. for a sufficient period of time, which is typically of from about 30 seconds to about 30 minutes. Secondly, a seed particle latex is prepared by aqueous emulsion polymerization of one portion of the core monomer emulsion and at least one free-radical initiator. Preferably, one portion of the core monomer emulsion and at least one free radical initiator is charged to a reactor which already has been charged with an aqueous solution of at least one surfactant of from about 0.5 to about 15 percent by weight of total monomer used to prepare the core latex polymer. Thirdly, subsequent to formation of the seed particle latex, a remaining portion of the core monomer emulsion is combined with at least one chain-transfer agent and added to the reactor to obtain the core latex polymer.

(B) A shell polymer encapsulates the core generated polymer. The shell polymer is made by first forming a shell monomer emulsion. Firstly, the shell monomer emulsion is prepared by emulsification of a mixture of polymerization reagents of at least one monomer, at least one chain-transfer agent, at least one surfactant, and water. Emulsification may be done by any suitable process, for example, high speed mixing at low temperatures. For instance, the mixture may be mixed in a homogenizer set at about 5,000 to about 25,000 rpm at about about 5° C. to about 40° C. for a sufficient period of time, which is typically of from about 30 seconds to about 30 minutes. Secondly, one portion of the shell monomer emulsion and at least one free-radical initiator are charged to the reactor containing the formed core latex polymer of (A). Preferably, one portion of the shell monomer emulsion and at least one free radical initiator is charged to a reactor which already has been charged with an aqueous solution of at least one surfactant of from about 0.5 to about 15 percent by weight of total monomer used to prepare the shell latex polymer, and the formed core latex polymer of (A). Thirdly, a remaining portion of the shell monomer emulsion is added to the reactor to obtain the core-shell latex polymer.

In a preferred embodiment of the invention, (A) a core polymer is made by first forming a core monomer emulsion. Firstly, the core monomer emulsion is prepared by emulsification of a mixture of polymerization reagents of at least one monomer, at least one chain-transfer agent, at least one surfactant, and water. Emulsification may be done by any suitable process, for example, high speed mixing at low temperatures. For instance, the mixture may be mixed in a homogenizer set at about 5,000 to about 25,000 rpm at about about 5° C. to about 40° C. for a sufficient period of time, which is typically of from about 30 seconds to about 30 minutes. Secondly, a seed particle latex is prepared by aqueous emulsion polymerization of one portion of the core monomer emulsion and at least one free-radical initiator. Preferably, one portion of the core monomer emulsion and at least one free radical initiator is charged to a reactor which already has been charged with an aqueous solution of at least one surfactant of from about 0.5 to about 15 percent by weight of total monomer used to prepare the core latex polymer. Thirdly, subsequent to formation of the seed particle latex, a remaining portion of the core monomer emulsion is combined with at least one chain-transfer agent and added to the reactor to obtain the core latex polymer.

(B) A shell polymer encapsulates the core generated polymer. The shell polymer is made by first forming a shell monomer emulsion. Firstly, the shell monomer emulsion is prepared by emulsification of a mixture of polymerization reagents of at least one monomer, at least one chain-transfer agent, at least one surfactant, and water. Emulsification may be done by any suitable process, for example, high speed mixing at low temperatures. For instance, the mixture may be mixed in a homogenizer set at about 5,000 to about 25,000 rpm at about about 5° C. to about 40° C. for a sufficient period of time, which is typically of from about 30 seconds to about 30 minutes. Secondly, one portion of the shell monomer emulsion and at least one free-radical initiator are charged to the reactor containing the formed core latex polymer of (A). Preferably, one portion of the shell monomer emulsion and at least one free radical initiator is charged to a reactor which already has been charged with an aqueous solution of at least one surfactant of from about 0.5 to about 15 percent by weight of total monomer used to prepare the shell latex polymer, and the formed core latex polymer of (A). Thirdly, a remaining portion of the shell monomer emulsion is combined with at least one chain-transfer agent and added to the reactor to obtain the core-shell latex polymer.

In a preferred embodiment of the invention, (A) a core polymer is made by first forming a core monomer emulsion. Firstly, the core monomer emulsion is prepared by emulsification of a mixture of polymerization reagents of at least one monomer, at least one chain-transfer agent, at least one surfactant, and water. Emulsification may be done by any suitable process, for example, high speed mixing at low temperatures. For instance, the mixture may be mixed in a homogenizer set at about 5,000 to about 25,000 rpm at about about 5° C. to about 40° C. for a sufficient period of time, which is typically of from about 30 seconds to about 30 minutes. Secondly, a seed particle latex is prepared by aqueous emulsion polymerization of one portion of the core monomer emulsion and at least one free-radical initiator. Preferably, one portion of the core monomer emulsion and at least one free radical initiator is charged to a reactor which already has been charged with an aqueous solution of at least one surfactant of from about 0.5 to about 15 percent by weight of total monomer used to prepare the core latex polymer. Thirdly, subsequent to formation of the seed particle latex, a remaining portion of the core monomer emulsion is added to the reactor to obtain the core latex polymer.

(B) A shell polymer encapsulates the core generated polymer. The shell polymer is made by first forming a shell monomer emulsion. Firstly, the shell monomer emulsion is prepared by emulsification of a mixture of polymerization reagents of at least one monomer, at least one chain-transfer agent, at least one surfactant, and water. Emulsification may be done by any suitable process, for example, high speed mixing at low temperatures. For instance, the mixture may be mixed in a homogenizer set at about 5,000 to about 25,000 rpm at about about 5° C. to about 40° C. for a sufficient period of time, which is typically of from about 30 seconds to about 30 minutes. Secondly, one portion of the shell monomer emulsion and at least one free-radical initiator are charged to the reactor containing the formed core latex polymer of (A). Preferably, one portion of the shell monomer emulsion and at least one free radical initiator is charged to a reactor which already has been charged with an aqueous solution of at least one surfactant of from about 0.5 to about 15 percent by weight of total monomer used to prepare the shell latex polymer, and the formed core latex polymer of (A). Thirdly, a remaining portion of the shell monomer emulsion is combined with at least one chain-transfer agent and added to the reactor to obtain the core-shell latex polymer.

The emulsion polymerization processes are most preferably conducted in a semi-continuous manner, and which may include the known starve fed method as described in U.S. Pat. No. 5,444,140. In particular, the remaining portion of the monomer emulsion is slowly added to the reactor over a period of time in forming the latex polymer; the monomer in the reaction is consumed by polymerization at about the same rated as it is added. For example, the remaining portion may be added to the reactor at a rate of from about 0.1 gram per kilogram of reactor content per minute to about 50 grams per kilogram of reactor content per minute, wherein all will be charged in about 90 minutes.

With respect to the core monomer emulsions described herein, the number of portions used of the core monomer emulsion in these processes can be at least one portion, when there is no chain-transfer partitioning, and can be at least two portions, when there is chain-transfer partitioning.

With respect to the shell monomer emulsions described herein, the number of portions used of the shell monomer emulsion in these processes can be at least one portion, when there is no chain-transfer partitioning, and can be at least two portions, when there is chain-transfer partitioning.

The mixture of polymerization reagents used to form the core and/or shell monomer emulsions can further comprise at least one cross-linking agent.

In process (A) and/or (B), the at least one surfactant is preferably present in the emulsion in an amount of from about 0.1% to about 10%, more preferably of from about 0.6% to about 1.2%, by weight of the total monomer used to prepare the core or shell latex polymer.

Preferably, one portion of the core monomer emulsion used to make the seed particle latex is of from about 0.5 to about 50 percent by weight of the total monomer emulsion used to prepare the core latex polymer and more preferably, of from about 15 to about 25 percent by weight of the total monomer emulsion used to prepare the core latex polymer and one portion of the shell monomer emulsion is of from about 0.5 to about 50 percent by weight of the total monomer emulsion used to prepare the shell latex polymer and more preferably, of from about 15 to about 25 percent by weight of the total monomer emulsion used to prepare the shell latex polymer. In these embodiments, when low weight percentages of one portion of the monomer emulsion is used, this process is preferably carried out on a smaller scale, for example, a bench-scale or a smaller plant-scale, as this particular embodiment of the process is highly exothermic. If this process was to be carried out on a larger scale, a cooling means, such as a cooling jacket for a reactor used for such a process, may be required.

The at least one chain-transfer agent of the core monomer emulsion may be present of from about 10 to about 80 percent by weight of total chain-transfer agent used to prepare the core latex polymer, and preferably, of from about 10 to 40 percent by weight.

The at least one chain-transfer agent added to the remaining core monomer emulsion may be present of from about 20 to about 90 percent by weight of total chain-transfer agent used to prepare the core latex polymer, and preferably, of from about 60 to 90 percent by weight. If desired, the chain-transfer agent may be separately added during the addition phase of the remaining core monomer emulsion.

The at least one chain-transfer agent of the shell monomer emulsion may be present of from about 10 to about 80 percent by weight of total chain-transfer agent used to prepare the shell latex polymer, and preferably, of from about 10 to 40 percent by weight.

The at least one chain-transfer agent added to the remaining shell monomer emulsion may be present of from about 20 to about 90 percent by weight of total chain-transfer agent used to prepare the shell latex polymer, and preferably, of from about 60 to 90 percent by weight. If desired, the chain-transfer agent may be separately added during the addition phase of the remaining shell monomer emulsion.

With respect to the core monomer emulsion, the total chain-transfer agent may be used in any effective amount, such as from about 0.005 to about 10 percent by weight of the total monomer used to prepare the core latex polymer, preferably, from about 0.1 to about 2 percent by weight.

The free-radical initiator is preferably of from about 0.1 to about 10 percent by weight of total monomer used to prepare the core latex polymer. Most preferably, the initiator is present of from about 0.1 to about 5 percent by weight. In other embodiments, the initiator may also be added at various phases in the process. For instance, the initiator could be added to the initial core monomer emulsion and/or to one portion of the core monomer emulsion. Also, the initiator could be added to the initial core monomer emulsion and/or to one portion of the core monomer emulsion, and to the remaining core monomer emulsion. The amount of the free-radical initiator added at a particular phase of the process may be from about 30% to 100% by weight, preferably from about 50% to 100% by weight, and most preferably 100% by weight of the total amount of free radical initiator used to prepare the core latex resin. Prior to addition, the temperature of the materials in the reactor is brought to, preferably, about 35° C. to about 125° C., which temperature is maintained during addition of the free-radical initiator. Preferably, the initiator is added only to one portion of the core monomer emulsion.

With respect to the shell monomer emulsion, the total chain-transfer agent may be used in any effective amount, such as from about 0.005 to about 10 percent by weight of the total monomer used to prepare the shell latex polymer, preferably, from about 0.1 to about 2 percent by weight.

The free-radical initiator is preferably of from about 0.1 to about 10 percent by weight of total monomer used to prepare the shell latex polymer. Most preferably, the initiator is present of from about 0.1 to about 5 percent by weight. In other embodiments, the initiator may also be added at various phases in the process. For instance, the initiator could be added to the initial shell monomer emulsion and/or to one portion of the shell monomer emulsion. Also, the initiator could be added to the initial shell monomer emulsion and/or to one portion of the shell monomer emulsion, and to the remaining shell monomer emulsion. The amount of the free-radical initiator added at a particular phase of the process may be from about 30% to 100% by weight, preferably from about 50% to 100% by weight, and most preferably 100% by weight of the total amount of free radical initiator used to prepare the shell latex resin. Prior to addition, the temperature of the materials in the reactor is brought to, preferably, about 35° C. to about 125° C., which temperature is maintained during addition of the free-radical initiator. Preferably, the initiator is added only to one portion of the shell monomer emulsion.

The first, second and third phases of (A) and (B) are, preferably, accomplished at a temperature of from about 5° C. to about 40° C.; of from about 35° C. to about 125° C.; and of from about 35° C. to about 125° C.; respectively.

Preferably, the temperature, as discussed above for the second phase, is maintained during formation of the subsequent core and shell latex polymer. More preferably, stirring is maintained thereafter, for example, of from about 10 to about 1,000 rpm.

In (A) and (B), the reactor is preferably heated for about 0.5 to about 14 hours, and more preferably, 1.5 to about 6 hours.

In a preferred embodiment of the invention, (A) a core polymer is made by first forming a core monomer emulsion. Firstly, the core monomer emulsion is prepared by emulsification of a mixture of polymerization reagents of at least one monomer, at least one chain-transfer agent, at least one surfactant, and water. Emulsification may be done by any suitable process, for example, high speed mixing at low temperatures. For instance, the mixture may be mixed in a homogenizer set at about 5,000 to about 25,000 rpm at about about 5° C. to about 40° C. for a sufficient period of time, which is typically of from about 30 seconds to about 30 minutes. Secondly, a seed particle latex is prepared by aqueous emulsion polymerization of one portion of the core monomer emulsion and at least one free-radical initiator. Preferably, one portion of the core monomer emulsion and at least one free radical initiator is charged to a reactor which already has been charged with an aqueous solution of at least one surfactant of from about 0.5 to about 15 percent by weight of total monomer used to prepare the core latex polymer. Thirdly, subsequent to formation of the seed particle latex, a second portion of the core monomer emulsion is added to the reactor. Fourthly, a remaining portion of the core monomer emulsion is added to the reactor and at least one chain-transfer agent is added to at least one of the second portion of the core monomer emulsion and the remaining portion of the core monomer emulsion to yield the core latex polymer.

(B) A shell polymer encapsulates the core generated polymer. The shell polymer is made by first forming a shell monomer emulsion. Firstly, the shell monomer emulsion is prepared by emulsification of a mixture of polymerization reagents of at least one monomer, at least one chain-transfer agent, at least one surfactant, and water. Emulsification may be done by any suitable process, for example, high speed mixing at low temperatures. For instance, the mixture may be mixed in a homogenizer set at about 5,000 to about 25,000 rpm at about about 5° C. to about 40° C. for a sufficient period of time, which is typically of from about 30 seconds to about 30 minutes. Secondly, one portion of the shell monomer emulsion and at least one free-radical initiator are charged to the reactor containing the formed core latex polymer of (A). Preferably, one portion of the shell monomer emulsion and at least one free radical initiator is charged to a reactor which already has been charged with an aqueous solution of at least one surfactant of from about 0.5 to about 15 percent by weight of total monomer used to prepare the shell latex polymer, and the formed core latex polymer of (A). Thirdly, a remaining portion of the shell monomer emulsion is added to the reactor to obtain the core-shell latex polymer.

In a preferred embodiment of the invention, (A) a core polymer is made by first forming a core monomer emulsion. Firstly, the core monomer emulsion is prepared by emulsification of a mixture of polymerization reagents of at least one monomer, at least one chain-transfer agent, at least one surfactant, and water. Emulsification may be done by any suitable process, for example, high speed mixing at low temperatures. For instance, the mixture may be mixed in a homogenizer set at about 5,000 to about 25,000 rpm at about about 5° C. to about 40° C. for a sufficient period of time, which is typically of from about 30 seconds to about 30 minutes. Secondly, a seed particle latex is prepared by aqueous emulsion polymerization of one portion of the core monomer emulsion and at least one free-radical initiator. Preferably, one portion of the core monomer emulsion and at least one free radical initiator is charged to a reactor which already has been charged with an aqueous solution of at least one surfactant of from about 0.5 to about 15 percent by weight of total monomer used to prepare the core latex polymer. Thirdly, subsequent to formation of the seed particle latex, a second portion of the core monomer emulsion is added to the reactor. Fourthly, a remaining portion of the core monomer emulsion is added to the reactor and at least one chain-transfer agent is added to at least one of the second portion of the core monomer emulsion and the remaining portion of the core monomer emulsion to yield the core latex polymer.

(B) A shell polymer encapsulates the core generated polymer. The shell polymer is made by first forming a shell monomer emulsion. Firstly, the shell monomer emulsion is prepared by emulsification of a mixture of polymerization reagents of at least one monomer, at least one chain-transfer agent, at least one surfactant, and water. Emulsification may be done by any suitable process, for example, high speed mixing at low temperatures. For instance, the mixture may be mixed in a homogenizer set at about 5,000 to about 25,000 rpm at about about 5° C. to about 40° C. for a sufficient period of time, which is typically of from about 30 seconds to about 30 minutes. Secondly, one portion of the shell monomer emulsion and at least one free-radical initiator are charged to the reactor containing the formed core latex polymer of (A). Preferably, one portion of the shell monomer emulsion and at least one free radical initiator is charged to a reactor which already has been charged with an aqueous solution of at least one surfactant of from about 0.5 to about 15 percent by weight of total monomer used to prepare the shell latex polymer, and the formed core latex polymer of (A). Thirdly, a second portion of the shell monomer emulsion is added to the reactor. Fourthly, a remaining portion of the shell monomer emulsion is added to the reactor and at least one chain-transfer agent is added to at least one of the second portion of the shell monomer emulsion and the remaining portion of the shell monomer emulsion to yield the core-shell latex polymer.

In a preferred embodiment of the invention, (A) a core polymer is made by first forming a core monomer emulsion. Firstly, the core monomer emulsion is prepared by emulsification of a mixture of polymerization reagents of at least one monomer, at least one chain-transfer agent, at least one surfactant, and water. Emulsification may be done by any suitable process, for example, high speed mixing at low temperatures. For instance, the mixture may be mixed in a homogenizer set at about 5,000 to about 25,000 rpm at about about 5° C. to about 40° C. for a sufficient period of time, which is typically of from about 30 seconds to about 30 minutes. Secondly, a seed particle latex is prepared by aqueous emulsion polymerization of one portion of the core monomer emulsion and at least one free-radical initiator. Preferably, one portion of the core monomer emulsion and at least one free radical initiator is charged to a reactor which already has been charged with an aqueous solution of at least one surfactant of from about 0.5 to about 15 percent by weight of total monomer used to prepare the core latex polymer. Thirdly, subsequent to formation of the seed particle latex, a remaining portion of the core monomer emulsion is added to the reactor to obtain the core latex polymer.

(B) A shell polymer encapsulates the core generated polymer. The shell polymer is made by first forming a shell monomer emulsion. Firstly, the shell monomer emulsion is prepared by emulsification of a mixture of polymerization reagents of at least one monomer, at least one chain-transfer agent, at least one surfactant, and water. Emulsification may be done by any suitable process, for example, high speed mixing at low temperatures. For instance, the mixture may be mixed in a homogenizer set at about 5,000 to about 25,000 rpm at about about 5° C. to about 40° C. for a sufficient period of time, which is typically of from about 30 seconds to about 30 minutes. Secondly, one portion of the shell monomer emulsion and at least one free-radical initiator are charged to the reactor containing the formed core latex polymer of (A). Preferably, one portion of the shell monomer emulsion and at least one free radical initiator is charged to a reactor which already has been charged with an aqueous solution of at least one surfactant of from about 0.5 to about 15 percent by weight of total monomer used to prepare the shell latex polymer, and the formed core latex polymer of (A). Thirdly, a second portion of the shell monomer emulsion is added to the reactor. Fourthly, a remaining portion of the shell monomer emulsion is added to the reactor and at least one chain-transfer agent is added to at least one of the second portion of the shell monomer emulsion and the remaining portion of the shell monomer emulsion to yield the core-shell latex polymer.

The emulsion polymerization process is most preferably conducted in a semi-continuous manner, and which may include the known starve fed method as described in U.S. Pat. No. 5,444,140. In particular, the second and remaining portions of the monomer emulsion are slowly added to the reactor over a period of time in forming the latex polymer; the monomer in the reaction is consumed by polymerization at about the same rated as it is added. For example, the second and remaining portions may each be added to the reactor at a rate of from about 0.1 gram per kilogram of reactor content per minute to about 50 grams per kilogram of reactor content per minute, wherein all will be charged in about 90 minutes.

In this particular embodiment, this process is less exothermic and, as a result, may be carried out on both a smaller scale, for example, a bench-scale or a smaller plant-scale, and a larger scale.

The mixture of polymerization reagents used to form the core and/or shell monomer emulsions can further comprise at least one cross-linking agent.

In process (A) and/or (B), the at least one surfactant is preferably present in the emulsion in an amount of from about 0.1% to about 10%, more preferably, of from about 0.6% to about 1.2%, by weight of the total monomer used to prepare the core or shell latex polymer.

Preferably, one portion of the core monomer emulsion is of from about 0.5 to about 33 percent by weight of the total monomer emulsion used to prepare the core latex polymer, more preferably, of from about 0.5 to about 5 percent by weight emulsion used to prepare the core latex polymer and most preferably, 1 percent by weight and one portion of the shell monomer emulsion is of from about 0.5 to about 33 percent by weight of the total monomer emulsion used to prepare the shell latex polymer, more preferably, of from about 0.5 to about 5 percent by weight used to prepare the shell latex polymer and most preferably, 1 percent by weight .

Preferably, the second portion of the core monomer emulsion is of from about 33 to about 65 percent by weight of the total monomer emulsion used to prepare the core latex polymer and more preferably, about 50 percent by weight and/or the second portion of the shell monomer emulsion is of from about 33 to about 65 percent by weight of the total monomer emulsion used to prepare the shell latex polymer and more preferably, about 50 percent by weight Most preferably, one portion of the core monomer emulsion is 1 percent by weight of the monomer emulsion used to prepare the core latex polymer and the second portion of the core monomer emulsion is 50 percent by weight of the monomer emulsion used to prepare the core latex polymer and one portion of the shell monomer emulsion is 1 percent by weight of the monomer emulsion used to prepare the shell latex polymer and the second portion of the shell monomer emulsion is 50 percent by weight of the monomer emulsion used to prepare the shell latex polymer.

The at least one chain-transfer agent of the core monomer emulsion may be present of from about 10 to about 80 percent by weight of total chain-transfer agent used to prepare the core latex polymer, and preferably, of from about 10 to 40 percent by weight.

The at least one chain-transfer agent added to the second and/or remaining core monomer emulsion may be present of from about 20 to about 90 percent by weight of total chain-transfer agent used to prepare the core latex polymer, and preferably, of from about 60 to 90 percent by weight. If desired, the chain-transfer agent may be separately added during the addition phase of the second and/or remaining core monomer emulsion. Preferably, the at least one chain-transfer agent is added only to the remaining core monomer emulsion.

The at least one chain-transfer agent of the shell monomer emulsion may be present of from about 10 to about 80 percent by weight of total chain-transfer agent used to prepare the shell latex polymer, and preferably, of from about 10 to 40 percent by weight.

The at least one chain-transfer agent added to the second and/or remaining shell monomer emulsion may be present of from about 20 to about 90 percent by weight of total chain-transfer agent used to prepare the shell latex polymer, and preferably, of from about 60 to 90 percent by weight. If desired, the chain-transfer agent may be separately added during the addition phase of the second and/or remaining shell monomer emulsion. Preferably, the at least one chain-transfer agent is added only to the remaining shell monomer emulsion.

With respect to the core monomer emulsion, the total chain-transfer agent may be used in any effective amount, such as from about 0.005 to about 10 percent by weight of the total monomer used to prepare the core latex polymer, preferably, from about 0.1 to about 2 percent by weight.

The free-radical initiator is preferably of from about 0.1 to about 10 percent by weight of total monomer used to prepare the latex polymer. Most preferably, the initiator is present of from about 0.1 to about 5 percent by weight. In other embodiments, the initiator may also be added at various phases in the process. For instance, the initiator could be added to the initial core monomer emulsion and/or to one portion of the core monomer emulsion. Also, the initiator could be added to the initial core monomer emulsion and/or to one portion of the core monomer emulsion, and to the remaining core monomer emulsion and/or to the remaining core monomer emulsion. The amount of the free-radical initiator added at a particular phase in the process may be from about 30% to 100% by weight, preferably from about 50% to 100% by weight, and most preferably 100% by weight of the total amount of free radical initiator used to prepare the core latex resin. Prior to addition, the temperature of the materials in the reactor is brought to, preferably, about 35° C. to about 125° C., which temperature is maintained during addition of the free-radical initiator. Preferably, the initiator is added only to one portion of the core monomer emulsion.

With respect to the shell monomer emulsion, the total chain-transfer agent may be used in any effective amount, such as from about 0.005 to about 10 percent by weight of the total monomer used to prepare the shell latex polymer, preferably, from about 0.1 to about 2 percent by weight.

The free-radical initiator is preferably of from about 0.1 to about 10 percent by weight of total monomer used to prepare the latex polymer. Most preferably, the initiator is present of from about 0.1 to about 5 percent by weight. In other embodiments, the initiator may also be added at various phases in the process. For instance, the initiator could be added to the initial shell monomer emulsion and/or to one portion of the shell monomer emulsion. Also, the initiator could be added to the initial shell monomer emulsion and/or to one portion of the shell monomer emulsion, and to the remaining shell monomer emulsion and/or to the remaining shell monomer emulsion. The amount of the free-radical initiator added at a particular phase in the process may be from about 30% to 100% by weight, preferably from about 50% to 100% by weight, and most preferably 100% by weight of the total amount of free radical initiator used to prepare the shell latex resin. Prior to addition, the temperature of the materials in the reactor is brought to, preferably, about 35° C. to about 125° C., which temperature is maintained during addition of the free-radical initiator. Preferably, the initiator is added only to one portion of the shell monomer emulsion.

The first, second, third and fourth phases of (A) and (B) are, preferably, accomplished at a temperature of from about 5° C. to about 40° C.; of from about 35° C. to about 125° C.; of from about 35° C. to about 125° C.; and of from about 35° C. to about 125° C.; respectively.

Preferably, the temperature, as discussed above for the second phase, is maintained during formation of the subsequent core and shell latex polymer. More preferably, stirring is maintained thereafter, for example, of from about 10 to about 1000 rpm.

In (A) and (B), the reactor is preferably heated for about 0.5 to about 14 hours, and more preferably, 1.5 to about 6 hours.

In another preferred embodiment of the invention, (A) a core polymer is made by first forming a core monomer emulsion. Firstly, the core monomer emulsion is prepared by high speed mixing, of from about 5,000 to about 25,000 rpm and at a temperature of from about 5° C. to about 40° C., a mixture of polymerization reagents of at least one monomer, at least one chain-transfer agent, at least one surfactant, and water. The core monomer emulsion is mixed for of from about 30 seconds to about 30 minutes. Secondly, a seed particle latex is prepared at a temperature of from about 35° C. to about 125° C. by charging one portion of the core monomer emulsion, of from about 0.5 to about 33 percent by weight of the total core monomer emulsion used to prepare the core latex polymer, and an aqueous solution of at least one free-radical initiator, of from about 30 to 100 percent by weight of the total amount of free-radical initiator used to prepare the core latex resin, to a reactor already charged with an aqueous solution of at least one surfactant of from about 0.5 to about 15 percent by weight of total monomer used to prepare the core latex polymer. This seed polymerization reaction is stirred continuously at of from about 10 to 1000 rpm to allow seed particle latex formation. The temperature and stirring is maintained, and thirdly, subsequent to formation of the seed particle latex, a second portion of the core monomer emulsion is added to the reactor, semi-continuously over a period of time. The second portion is of from about 33 to about 65 percent by weight of the total core monomer emulsion used to prepare the core latex polymer. Fourthly, a remaining portion of the core monomer emulsion and at least one chain-transfer agent, of from about 60 to about 90 percent by weight of total chain-transfer agent used to prepare the core latex polymer, is added to the reactor. The second and remaining portions are each added to the reactor at a rate of from about 0.1 gram per kilogram of reactor content per minute to about 50 grams per kilogram of reactor content per minute, wherein all will be charged in about 90 minutes. The final mixture is heated and stirred at a temperature of from about 35° C. to about 125° C., for of from about 1.5 to 6 hours.

(B) A shell polymer encapsulates the core generated polymer. The shell polymer is made by first forming a shell monomer emulsion. Firstly, the shell monomer emulsion is prepared by high speed mixing, of from about 5,000 to about 25,000 rpm and at a temperature of from about 5° C. to about 40° C., a mixture of polymerization reagents of at least one monomer, at least one chain-transfer agent, at least one surfactant, and water. The shell monomer emulsion is mixed for of from about 30 seconds to about 30 minutes. Secondly, one portion of the shell monomer emulsion, of from about 0.5 to about 33 percent by weight of the total monomer emulsion used to prepare the shell latex polymer, and an aqueous solution of at least one free-radical initiator, of from about 30 to 100 percent by weight of the total amount of free-radical initiator used to prepare the shell latex resin, are charged to a reactor already charged with an aqueous solution of at least one surfactant of from about 0.5 to about 15 percent by weight of total monomer used to prepare the shell latex polymer and containing the formed core latex polymer of (A). The temperature of the reactor is of from about 35° C. to about 125° C. and the reaction is stirred continuously at of from about 10 to 1,000 rpm. The temperature and stirring is maintained, and thirdly, a second portion of the shell monomer emulsion is added to the reactor, semi-continuously over a period of time. The second portion is of from about 33 to about 65 percent by weight of the total monomer emulsion. Fourthly, a remaining portion of the shell monomer emulsion and at least one chain-transfer agent, of from about 60 to about 90 percent by weight of total chain-transfer agent used to prepare the shell latex polymer, is added to the reactor. The second and remaining portions are each added to the reactor at a rate of from about 0.1 gram per kilogram of reactor content per minute to about 50 grams per kilogram of reactor content per minute, wherein all will be charged in about 90 minutes. The final mixture is heated and stirred at a temperature of from about 35° C. to about 125° C., for of from about 1.5 to 6 hours and cooled to provide the latex polymer. During both processes (A) and (B), the system was purged with nitrogen.

The core-shell latexes can be prepared by semi-continuous emulsion polymerization sequences wherein the monomer mixture used to prepare the core and the shell polymers may or may not have different monomer compositions. If the monomer compositions for the core and shell polymers are the same, the chain-transfer agent partitioning may be varied to provide a high $M_w$ (weight average molecular weight) core and a low $M_w$ (weight average molecular weight) shell, or vice-versa, while maintaining a substantially similar $M_n$ (number average molecular weight).

The resulting core-shell latexes of the various embodiments comprise particles that are, preferably, about 10 to 60 percent by weight, and more preferably about 20 to 50 percent by weight, of a polymeric core based on core-shell polymer and preferably, about 40 to 90 percent by weight, and more preferably about 50 to 80 percent by weight of a polymeric shell thereover based on core-shell polymer. Preferably, the polymeric shell has a thickness of, for example, about 0.01 microns to about 0.3 microns, and preferably of from about 0.03 microns to about 0.2 microns. In preferred embodiments, the monomers of the first monomer composition are selected in a manner to provide a Tg (glass transition temperature) in the core of, for example, about 20° C. to about 50° C., and preferably about 30° C. to about 50° C., and a $M_w$ (weight average molecular weight) of, for example, about 5,000 to about 30,000, and preferably of about 8,000 to about 25,000, and the second shell forming monomer composition, which form the polymer shell that encapsulates the core, are selected in a manner to provide a Tg (glass transition temperature) in the shell of, for example, about 50° C. to about 70° C., and preferably about 55° C. to about 65° C., and a $M_w$ (weight average molecular weight) of 30,000 or higher, preferably of 40,000 or higher, such as about 40,000 to about 200,000.

As to the at least one monomer of the processes described herein, any suitable monomer or mixture of monomers capable of forming a polymer through reaction with a free radical initiator or propagating free radical species may be used. Preferred monomers useful in the present invention are the acrylic and methacrylic esters, styrene, acrylonitrile, vinyl esters of aliphatic acids, ethylenically unsaturated carboxylic acids, and crosslinking agents. Suitable ethylenically unsaturated carboxylic acids may include, for example, acrylic acid, methacrylic acid, itaconic acid, maleic acid, fumaric acid, 2-carboxyethyl acrylate (β-CEA) and the like and mixtures thereof. Suitable cross-linking agents for use with the monomers may include, for example, divinyl benzene; divinyl toluene; diacrylates, such as decanediol diacrylate, hexanediol diacrylate, nonanediol diacrylate; dimethacrylates, such as decanediol dimethacrylate (A-DOD), nonanediol dimethacrylate, hexanediol dimethacrylate; butadiene and the like and mixtures thereof.

Thus, examples of monomers suitable for use in the polymerization process of the present invention include, but are not limited to those used for obtaining styrene/butadiene resins, styrene/acrylate resins, styrene/methacrylate resins and vinyl resins. Suitable vinyl resins include homopolymers or copolymers of two or more vinyl monomers. Typical examples of vinyl monomeric units include but are not limited to: styrene, p-chlorostyrene, vinyl naphthalene, vinyl chloride, vinyl bromide, vinyl fluoride, ethylenically unsaturated monoolefins such as ethylene, propylene, butylene, isobutylene and the like; vinyl esters such as vinyl acetate, vinyl propionate, vinyl benzoate, vinyl butyrate, and the like; esters of alphamethylene aliphatic monocarboxylic acids such as methyl acrylate, ethyl acrylate, n-butyl acrylate, isobutyl acrylate, dodecyl acrylate, n-octyl acrylate, 2-chloroethyl acrylate, 2-carboxyethyl acylate, phenyl acrylate, methylalphachloroacrylate, methyl methacrylate, ethyl methacrylate, butyl methacrylate and the like; acrylonitrile, methacrylonitrile, acrylamide, vinyl ethers such as vinyl methyl ether, vinyl isobutyl ether, vinyl ethyl ether and the like; vinyl ketones such as vinyl methyl ketone, vinyl hexyl ketone, methyl isopropenyl ketone and the like; vinylidene halides such as vinylidene chloride, vinylidene chlorofluoride and the like; N-vinyl indole, N-vinyl pyrrolidene and the like; dienes, such as butadiene and isoprene and the like; and mixtures thereof. A water soluble monomer such as acrylic or methacrylic acid, in an amount of from about 0.01% to about 10% by weight of monomer, and preferably from about 0.1% to 3% by weight, may also be included. Small amounts of water soluble monomers may impart additional latex stability in emulsion polymerization processes. Preferably with respect to the core-shell polymers, the preferred monomers for the polymeric core include styrene, butadiene, isoprene, acrylates, methacrylates, acrylonitrile, acrylic acid, methacrylic acid, and mixtures thereof, and the preferred monomers for the polymeric shell include styrene, acrylates, methacrylates, acrylonitrile, acrylic acid, methacrylic acid, and mixtures thereof.

The at least one monomer is present in an amount of from about 1% to about 98% by weight based on the total weight of polymerization reaction components used in a given particle formation or growth phase of the present process. The monomer or monomers used are preferably substantially water insoluble, generally hydrophobic, and can be readily dispersed in the aqueous phase with adequate stirring when added to a reaction vessel. The dispersal of the reactive monomers can be further enhanced and assisted by in situ stabilization or oligosurfactant formation resulting from the free-radical addition reaction of a water soluble initiator, such as persulfate, to the added reactive monomers. Optionally, anionic or cationic surfactant may be used to assist the dispersion process.

The presence of surfactants can be important with regard to stabilizing the emulsion polymerization process. Generally, the surfactants used include both ionic and nonionic surfactants. However, these same surfactants that contribute to an advantage in the emulsion polymerization could also adversely affect the functional properties or processing of the final toners. In particular, the presence of surfactants, particularly nonionic surfactants, can contribute to undesirable final toner characteristics, such as sensitivity to relative humidity, low tribo charge, high dielectric loss, aging and poor toner flow. Therefore, ionic surfactants are preferred. More preferably, an anionic surfactant is the only surfactant used in the emulsion. Preferred anionic surfactants include the emulsifier or surfactant selected from the formula:

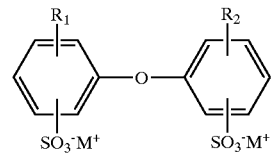

wherein $R_1$ or $R_2$ is hydrogen, or alkyl with, for example, from about 1 to about 25 carbons and preferably from about 6 to about 16 carbon atoms, and M is hydrogen, an alkali metal, such as sodium, or potassium, or ammonium (NH$_4$) with the preferred emulsifier being sodium tetrapropyl diphenyloxide disulfonate. For sodium n-decyl diphenyloxide disulfonate, $R_1$ is hydrogen, $R_2$ is a n-decyl group, and M is sodium. Examples of specific emulsifiers include sodium hexyl diphenyloxide disulfonate, sodium n-decyl diphenyloxide disulfonate, sodium n-dodecyl diphenyloxide disulfonate, sodium n-hexadecyl diphenyloxide disulfonate, sodium palmityl diphenyloxide disulfonate, n-decyl diphenyloxide disulfonic acid, n-dodecyl diphenyloxide disulfonic acid, and tetrapropyl diphenyloxide disulfonic acid.

Other specific emulsifiers or surfactants include diphenyloxide disulfonates, such as DOWFAX 2A1™, DOWFAX 3A2™, DOWFAX 8390™ available Dow Chemical, RHODACAL DSB™ available from Rhone-Poulenc, POLY-TERGENT 2A1™, POLY-TERGENT 2EP™ available from Olin, AEROSOL DPOS45™ available from Cytec, CALFAX DBA-40™, CALFAX 16L-35™ available from Pilot Chemicals, and the like. Diphenyloxide disulfonates can be prepared by a Friedl-Kraft alkylation reaction of diphenyloxide using defined alkane fractions, followed by sulfonation. Diphenyloxide disulfonate emulsifiers represents a class of highly anionic surface active agents consisting of disulfonated alkyl diphenyl oxide molecules in which the charge arises from two sulfonate groups rather than one as in the majority of surfactants (such as dodecylbenzene sulfonate), provides excellent emulsion stability. The Dow Chemical available components, reference, for example, Dow bulletins entitled DOWFAX Anionic Surfactants For High Performance Products should have a high electrolyte tolerance, high mechanical stability, and excellent stability in concentrated acids and alkalis. Diphenyloxide disulfonates also possess high oxidation resistance and high temperature stability up to, for example, 95° C. rendering them suitable for use in emulsion polymerization.

Illustrative examples of specific latex resin, polymer or polymers, core polymers or shell polymers, selected for the process of the present invention include known polymers such as poly(styrene-butadiene), poly(methyl methacrylate-butadiene), poly(ethyl methacrylate-butadiene), poly(propyl methacrylate-butadiene), poly(butyl methacrylate-butadiene), poly(styrene-isoprene), poly(methyl methacrylate-isoprene), poly(ethyl methacrylate-isoprene), poly(propyl methacrylate-isoprene), poly(butyl methacrylate-isoprene), poly(styrene-propyl acrylate), poly(styrene-butyl acrylate), poly(styrene-2-ethylhexyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-2-ethylhexyl acrylate-acrylic acid), poly(styrene-butyl acrylate-methacrylic acid), poly(styrene-2-ethylhexyl acrylate-methacrylic acid), poly(styrene-butyl acrylate-acrylononitrile), and poly(styrene-butyl acrylate-acrylononitrile-acrylic acid), poly(methyl methacrylate-propyl acrylate), poly(methyl methacrylate-butyl acrylate), poly(methyl methacrylate-butadiene-acrylic acid), poly(methyl methacrylate-butadiene-methacrylic acid), poly(methyl methacrylate-butadiene-acrylonitrile-acrylic acid), poly(methyl methacrylate-butyl acrylate-acrylic acid), poly(methyl methacrylate-butyl acrylate-methacrylic acid), poly(methyl methacrylate-butyl acrylate-acrylononitrile), and poly(styrene-butyl acrylate-acrylononitrile-acrylic acid), and the preferred polymers for the shell include poly(styrene-butadiene), poly(methyl methacrylate-butadiene), poly(styrene-isoprene), poly(methyl methacrylate-isoprene), poly(ethyl methacrylate-isoprene), poly(butyl methacrylate-isoprene), poly(styrene-propyl acrylate), poly(styrene-butyl acrylate), poly(styrene-2-ethylhexyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-2-ethylhexyl acrylate-acrylic acid), poly(styrene-butyl acrylate-methacrylic acid), poly(styrene-2-ethylhexyl acrylate-methacrylic acid), poly(styrene-butyl acrylate-acrylononitrile), and poly(styrene-butyl acrylate-acrylononitrile-acrylic acid), poly(methyl methacrylate-propyl acrylate), poly(methyl methacrylate-butyl acrylate), poly(methyl methacrylate-butadiene-acrylic acid), poly(methyl methacrylate-butadiene-methacrylic acid), poly(methyl methacrylate-butadiene-acrylonitrile-acrylic acid), poly(methyl methacrylate-butyl acrylate-acrylic acid), poly(methyl methacrylate-butyl acrylate-acrylic acid), poly(methyl methacrylate-butyl acrylate-methacrylic acid), poly(methyl methacrylate-butyl acrylate-acrylononitrile), and poly(styrene-butyl acrylate-acrylononitrile-acrylic acid) and the like.

Chain-transfer agents that may be used in the present invention include, but are not limited to, dodecanethiol, butanethiol, isooctyl-3-mercaptopropionate (IOMP), 2-methyl-5-t-butylthiophenol, carbon tetrachloride, carbon tetrabromide, and the like. Chain-transfer agents are utilized to control the molecular weight properties of the polymer during emulsion polymerization processes.

The free-radical initiator for the preparation of the latexes of the present invention may be selected from various known free-radical polymerization initiators. The free-radical initiator can be any free-radical initiator capable of initiating a free-radical polymerization process, or mixtures thereof. Preferably, the free-radical initiator is capable of providing free-radical species upon heating above about 30° C. Preferably, the free-radical initiator is capable of producing a polymer with ionic, hydrophilic end groups at a sufficiently high concentration to produce a stable latex.

Water soluble free radical initiators or polymerization initiators employed in the process of the present invention include those that are traditionally used in emulsion polymerization reactions and that provide a water soluble or polar phase compatible functional group upon reaction with the monomers. Examples of water soluble free radical initiators are persulfates, water soluble peroxides and hydroperoxides; more preferably, sodium, potassium and ammonium persulfates, hydrogen peroxide, t-butyl hydroperoxide, cumene hydroperoxide, para-menthane hydroperoxide, and peroxy carbonates. Most preferably, the initiator is a persulfate initiator such as ammonium persulfate, potassium persulfate, sodium persulfate or mixtures thereof. Other water soluble initiators of a similar decomposition mechanism may be used if desired, for example, azo compounds such as 4,4'-azobis(4-cyanovaleric acid); 1,1'-azobis(1-methylbutyronitrile-3-sodium sulfonate); 2,2'-azobis(2-amidinopropane)dihydrochloride; 2,2'-azobis(isobutyl amide)dihydrate; 2,2'-azobis(2-(2-imidazolin-2-yl)propane) dihydrochloride; and 2,2'-azobis(2-(5-methyl-2-imidazolin-2-yl)propane)dihydrochloride.

The chain-transfer agent partitioning processes of the present invention, preferably, achieve polymer latex sizes from about 150 to about 300 nanometers and more preferably, from about 175 to about 225 nanometers particle size.

Chain-transfer agent partitioning is utilized to produce wide range $M_w$ (weight average molecular weight) latex polymers without increasing or decreasing $M_n$ (number average molecular weight) and thus, maintaining a substantially similar Tg (glass transition temperature). It is preferable that these processes be able to provide a $M_w$ (weight average molecular weight) range of from about 25,000 to 100,000 and maintain a $M_n$ (number average molecular weight) range of from about 8,000 to 12,000, More preferably, a $M_w$ (weight average molecular weight) range of from about 29,000 to 37,000 and a $M_n$ (number average molecular weight) range less than 12,000.

In the present invention, any type of reactor may be suitably used without restriction. The reactor preferably includes a means for stirring the compositions therein. More preferably, the reactor includes at least one impeller. In forming the latex of the present invention, the reactor is preferably operated throughout the process such that the impellers operate at about 10 to about 1000 rpm.

In other embodiments of the invention, a toner is made by first aggregating a colorant dispersion with the latex emulsion, prepared as illustrated herein, to generate aggregates. Secondly, the aggregates are coalesced or fused to produce the toner. Optionally, but preferably, the toner is isolated, washed and dried.

Preferably, aggregation of the colorant dispersion with the latex emulsion occurs at a temperature below about the latex polymer glass transition temperature present in the latex emulsion, of from about 25° C. to about 60° C., more preferably of from about 35° C. to about 55° C., and the coalescing or fusing of the aggregates occurs at a temperature above about the polymer glass transition temperature, of from about 60° C. to about 100° C., more preferably of from about 70° C. to about 95° C.

The resulting toner size is preferably of from about 2 to about 20 microns, more preferably of from about 2 to about 10 microns, in volume average diameter.

More preferable embodiments include: a process for the preparation of toner, wherein the temperature at which said aggregation is accomplished controls the size of the aggregates, and wherein the temperature is from about 45° C. to about 55° C. and time of said coalescence or fusion of the components of aggregates control the shape of the resultant toner; a process wherein the coalescence or fusion temperature is from about 80° C. to about 95° C.; a process wherein there is further selected for the latex preparation a co-surfactant selected from the group consisting of alkanes, hydrocarbyl alcohols, ethers, amines, halides, and esters; a process wherein the colorant is a pigment, and wherein said pigment dispersion contains an ionic surfactant; a process wherein the surfactant utilized in the colorant dispersion is a cationic surfactant; a process wherein the aggregation is conducted at a temperature of about 15° C. to about 1° C. below the Tg (glass transition temperature) of the latex polymer, or latex resin for a duration of from about 0.5 hour to about 3 hours; and wherein the coalescence or fusion of the components of aggregates for the formation of integral toner particles comprised of colorant, resin and additives is accomplished at a temperature of about 85° C. to about 105° C. for a duration of from about 1 hour to about 5 hours; a process wherein the latex polymer contains a polymer selected from the group consisting of poly(styrene-alkyl acrylate), poly(styrene-1,3-diene), poly(styrene-alkyl methacrylate), poly(styrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly(styrene-1,3-diene-acrylonitrile-acrylic acid), and poly(alkyl acrylate-acrylonitrile-acrylic acid; a process wherein the latex contains a polymer selected from the group consisting of poly(styrenebutadiene), poly (methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly (butyl acrylate-butadiene), poly(styrene-isoprene), poly (methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), and poly(butyl acrylate-isoprene); poly(styrene-propyl acrylate), poly (styrene-butyl acrylate), poly(styrene-butadiene-acrylic acid), poly(styrene-butadiene-methacrylic acid), poly (styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), and poly(styrene-butyl acrylate-acrylononitrile-acrylic acid; a process wherein the colorant is carbon black, cyan, yellow, magenta, and mixtures thereof; a process wherein the toner particles isolated are from about 2 to about 10 microns in volume average diameter, and the particle size distribution thereof is from about 1.15 to about 1.30, and wherein there is added to the surface of the formed toner metal salts, metal salts of fatty acids, silicas, metal oxides, or mixtures thereof, each in an amount of from about 0.1 to about 10 weight percent of the obtained toner particles; a process wherein said disulfonate is sodium n-decyl diphenyloxide disulfonate, or sodium n-hexyl diphenyloxide disulfonate; and a process wherein alkyl contains from 1 to about 25 carbon atoms; a process wherein said alkali metal is sodium or potassium.

In other embodiments of the invention, a toner is made by first blending an aqueous pigment dispersion, containing an ionic surfactant, with the latex emulsion prepared as illustrated herein, and an emulsifier with a charge polarity opposite to that of the ionic surfactant in the pigment dispersion. Secondly, the resulting mixture is heated at a temperature of from about 25° C. to about 1° C. below the Tg (glass transition temperature) of the latex polymer to form toner sized aggregates. Thirdly, the aggregate suspension is heated to a temperature of about 75° C. to about 120° C. to effect coalescence or fusion of the components of aggregates to enable formation of integral toner particles comprised of polymer, and colorant. Finally, the toner is isolated, for example, by filtration, and followed by washing and drying.

In embodiments the present invention is directed to processes for the preparation of toner compositions. Firstly, an ionic colorant mixture is prepared by dispersing a colorant, especially pigment, such as carbon black, red, blue, HOSTAPERM PINK™, or PV FAST BLUE™ in an aqueous surfactant solution containing a cationic surfactant, such as dialkylbenzene dialkylammonium chloride like SANIZOL B-50™ available from Kao, or MIRAPOL™ available from Alkaril Chemicals, by means of a high shearing device such as a Brinkmann Polytron or IKA homogenizer. Secondly, the aforementioned colorant, especially pigment mixture, is added to a mixture of a water, optional known toner additive, and a latex emulsion prepared as illustrated herein and comprised of polymer particles of, for example, poly (styrene-butyl acrylate-acrylic acid), poly(styrene-butadiene-acrylic acid), and the like, and the sulfonate emulsifier, a nonionic surfactant such as polyethylene glycol or polyoxyethylene glycol nonyl phenyl ether or IGEPAL 897™ obtained from GAF Chemical Company, and an optional cosurfactant, thereby causing a flocculation of pigment, polymer particles and optional additives. Thirdly, the resulting flocculent mixture is homogenized with a high shearing device, such as a Brinkmann Polytron or IKA homogenizer, and further stirred with a mechanical stirrer at a temperature of about 1° C. to about 25° C., below the Tg (glass transition temperature) of the latex polymer, to form toner sized aggregates of from about 2 microns to about 20 microns in volume average diameter. Fourthly, the mixture is heated in the presence of an additional anionic surfactant or nonionic surfactant at a temperature of 120° C. or below for a duration of, for example, from about 1 to about 5 hours to form 2 to about 12 micron toner preferably with a particle size distribution of from about 1.15 to about 1.35 as measured by the Coulter Counter. Fifthly, the toner particles are isolated by filtration, washing, and drying. Additives to improve flow characteristics and charge additives, if not initially present, to improve charging characteristics may then be added by blending with the formed toner, such additives including AEROSILS® or silicas, metal oxides like tin, titanium and the like, metal salts of fatty acids like zinc stearate, and which additives are present in various effective amounts, such as from about 0.1 to about 10 percent by weight of the toner.

The latex polymer is generally present in the toner compositions in various effective amounts, such as from about 75 weight percent to about 98 weight percent of the toner, and the latex resin size suitable for the processes of the present invention can have a particle size, for example, of from about 150 to about 300 nm. Other sizes and effective amounts of latex polymer may be selected in embodiments.

Various known colorants, such as pigments, present in the toner in an effective amount of, for example, from about 1 to about 15 percent by weight of toner, and preferably in an amount of from about 3 to about 10 percent by weight, that can be selected include carbon black like REGAL 330®; magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; and the like. As colored pigments, there can be selected cyan, magenta, yellow, red, green, brown, blue or mixtures thereof. Specific examples of pigments include phthalocyanine HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like. Generally, colored pigments and dyes that can be selected are cyan, magenta, or yellow pigments, and mixtures thereof. Examples of magentas include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans include copper tetra (octadecyl sulfonamido) phthalocyanine, x-copper phthalocyanine pigment listed in the Color Index as CI 74160, CI Pigment Blue, and Anthrathrene Blue, identified in the Color Index as CIl 69810, Special Blue X-2137, and the like; while illustrative examples of yellows that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as pigments with the process of the present invention. Colorants include pigment, dye, mixtures of pigment and dye, mixtures of pigments, mixtures of dyes, and the like.

The toner may also include known charge additives in effective suitable amounts of, for example, from 0.1 to 5 weight percent such as alkyl pyridinium halides, bisulfates, the charge control additives of U.S. Pat. Nos. 3,944,493; 4,007,293; 4,079,014; 4,394,430 and 4,560,635, which illustrates a toner with a distearyl dimethyl ammonium methyl sulfate charge additive, the disclosures of which are totally incorporated herein by reference, negative charge enhancing additives like aluminum complexes, and the like.

Surfactants in effective amounts of, for example, 0.01 to about 15 weight percent of the reaction mixture in embodiments include, for example, nonionic surfactants, such as dialkylphenoxypoly(ethyleneoxy) ethanol, available from Rhone-Poulenc as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™, in effective amounts of, for example, from about 0.1 to about 10 percent by weight of the reaction mixture; anionic surfactants, such as for example sodium dodecylsulfate (SDS), sodium tetrapropyl diphenyloxide disulfide, sodium dodecylbenzene sulfonate, sodium dodecylnaphthalene sulfate, dialkyl benzenealkyl, sulfates and sulfonates, abitic acid, available from Aldrich, NEOGEN R™, NEOGEN SC™ obtained from Kao, BIOSOFT D-40™ obtained from Stepan, and the like, in effective amounts of, for example, from about 0.01 to about 10 percent by weight; cationic surfactants such as for example dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™ available from Alkaril Chemical Company, SANIZOL™ (benzalkonium chloride), available from Kao Chemicals, and the like, in effective amounts of, for example, from about 0.01 percent to about 10 percent by weight. Preferably, the molar ratio of the cationic surfactant used for flocculation to the anionic surfactant used in the latex preparation is in the range of from about 0.5 to 4.

Examples of the surfactant, which can be added to the aggregates before coalescence is initiated, can be anionic surfactants, such as sodium dodecylbenzene sulfonate, sodium dodecylnaphthalene sulfate, dialkyl benzenealkyl, sulfates and sulfonates, abitic acid, available from Aldrich, NEOGEN R™, NEOGEN SC™ obtained from Kao, BIOSOFT D-40™ obtained from Stepan, and the like. They can also be selected from nonionic surfactants such as polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxypoly(ethyleneoxy) ethanol, available from Rhone-Poulenc as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™. An effective amount of the anionic or nonionic surfactant utilized in the coalescence to primarily stabilize the aggregate size against further growth with temperature is, for example, from about 0.01 to about 10 percent by weight, and preferably from about 0.5 to about 5 percent by weight of the reaction.

Surface additives that can be added to the toner compositions after washing or drying include, for example, metal salts, metal salts of fatty acids, colloidal silicas, metal oxides like titanium oxides, mixtures thereof and the like, which additives are usually present in an amount of from about 0.1 to about 2 weight percent, reference U.S. Pat. Nos. 3,590, 000; 3,720,617; 3,655,374 and 3,983,045, the disclosures of which are totally incorporated herein by reference. Preferred additives include zinc stearate and AEROSIL R972® available from Degussa in amounts of from about 0.1 to about 2 percent which can be added during the aggregation process or blended into the formed toner product.

Developer compositions can be prepared by mixing the toners obtained with the processes of the present invention with known carrier particles, including coated carriers, such as steel, ferrites, and the like, reference U.S. Pat. Nos. 4,937,166 and 4,935,326, the disclosures of which are totally incorporated herein by reference, for example from about 2 percent toner concentration to about 8 percent toner concentration.

Imaging methods are also envisioned with the toners of the present invention, reference for example a number of the patents mentioned herein, and U.S. Pat. Nos. 4,265,990;

4,585,884 and 4,563,408, the disclosures of which are totally incorporated herein by reference.

EXAMPLES

The following examples are being submitted to further illustrate various embodiments of the present invention. These examples are intended to be illustrative only and are not intended to limit the scope of the present invention.

Examples IA and IB represent examples with and without chain-transfer agent partitioning.

Examples IIA and IIB represent examples with varying ratios of chain-transfer agent partitioning in the monomer emulsion.

Example IA

A non-ionic surfactant free latex was prepared by the semi-continuous emulsion polymerization of styrene/n-butyl acrylate/2-carboxyethyl acrylate (β-CEA) copolymer, 75/24/3 parts (by weight), using 1.50 pph of 1-dodecanethiol (DDT; the first monomer emulsion portion contained 0.5 pph and the second monomer emulsion portion contained 2.097 pph) as a chain-transfer agent, 0.35 pph of decanediol diacrylate (A-DOD) as a cross-linking agent and 1.5 percent by weight (based on monomer content) of ammonium persulfate as an initiator. A 2 Liter jacketed stainless steel reactor, with double flight impellers, containing 2.61 grams of DOWFAX 2A1™ (sodium tetrapropyl diphenyloxide disulfonate, 47 percent active, available from Dow Chemical) and 583.7 grams of deionized water was stirred at 200 rpm while the temperature was about 75° C. In a 2 Liter container, a monomer emulsion was prepared by vigorously mixing a monomer mixture (466.64 grams of styrene, 147.36 grams of n-butyl acrylate, 18.2 grams of β-CEA, 2.15 grams of decanediol diacrylate (A-DOD (crosslinker) and 3.07 grams of 1-dodecanethiol) with an aqueous solution (10.45 grams of DOWFAX 2A1™ and 291.85 grams of deionized water) for 30 minutes at room temperature (of about 25° C.) 9.4 grams of seed was removed from the monomer emulsion and added to the reactor at a temperature of about 75° C., and stirred for 5 minutes at about 75° C. An initiator solution prepared from 9.21 grams of ammonium persulfate in 45.40 grams of deionized water was added to the reactor mixture over 20 minutes. Stirring continued at 75° C. for an additional 20 minutes to allow seed particle formation. Approximately half of the remaining monomer emulsion was fed continuously into the reactor over 90 minutes. 6.14 grams of 1-dodecanethiol was then added to the remaining emulsion in the container and this mixture was stirred for 5 minutes before feeding of the remaining emulsion resumed. After the above monomer emulsion addition was completed, the reaction was allowed to post react for 180 minutes at 75° C. and then cooled. The system was purged with nitrogen during the whole process. The resulting latex polymer possessed a $M_w$ (weight average molecular weight) of 51,200, an $M_n$ (number average molecular weight) of 11,700, as determined on a Waters GPC, and an on-set Tg (glass transition temperature) of 49.2° C., as measured on a Seiko DSC. The latex resin containing 41.2% solids possessed a volume average diameter of 211 nanometers as measured by light scattering technique on a Coulter N4 Plus Particle Sizer.

Toner Preparation 466 milliliters of deionized water mixture was added to a 2 liter stainless steel reaction vessel at room temperature (of about 25° C.). 204 Grams of the above prepared latex was added to the vessel and homogenized, then 37.2 grams of Polywax 725 (obtained from Petrolite Chemicals) was added to the reaction vessel, followed by 35 grams of PB15:3 cyan pigment. While homogenizing this latex blend, 2.45 grams of 10 percent polyaluminum chloride solution with 22 grams of 0.02M nitric acid was added slowly, over a period of about 5 minutes, to the vessel, causing flocculation. After the addition was completed, homogenization was continued for an additional 5 minutes or until a toner slurry, wherein the solids of the slurry were achieved having a particle size of less than about 2 microns in diameter, specifically, 1.5 microns. The resultant slurry was then heated to about 45° C. Particle growth was monitored during heating such that when the particle size reached 4.8 microns, 97 grams of shell latex was added in 15 minutes. Another 15 minutes later, the pH of the slurry was adjusted to 7 by the addition of 1 percent sodium hydroxide to "freeze" the toner particle size. After 30 minutes of stirring at the polymer aggregation temperature, the reactor temperature was raised to 96° C. for 4 to 6 hours. Using nitric acid, the toner slurry pH was adjusted to about 4 to permit speroidization of the toner into spherical shaped toners. The vessel contents were then cooled to 25° C. and 5.5 micron cyan particles with GSD (toner particle size distribution defined by geometric standard deviation) of 1.20 was achieved.

Example IB

A non-ionic surfactant free latex was prepared by the semi-continuous emulsion polymerization of styrene/n-butyl acrylate/2-carboxyethyl acrylate (β-CEA) copolymer, 75/24/3 parts (by weight), using 1.50 pph of 1-dodecanethiol (DDT) as a chain-transfer agent, 0.35 pph of decanediol diacrylate (A-DOD) as a crosslinker and 1.5 percent by weight (based on monomer content) of ammonium persulfate as an initiator. A 2 Liter jacketed stainless steel reactor, with double flight impellers, containing 2.61 grams of DOWFAX 2A1™ (sodium tetrapropyl diphenyloxide disulfonate, 47 percent active, available from Dow Chemical) and 583.7 grams of deionized water was stirred at 200 rpm while the temperature was about 75° C. In a 2 Liter container, a monomer emulsion was prepared by vigorously mixing a monomer mixture (466.64 grams of styrene, 147.36 grams of n-butyl acrylate, 18.2 grams of β-CEA, 2.15 grams of decanediol diacrylate (A-DOD (crosslinker) and 9.21 grams of 1-dodecanethiol) with an aqueous solution (10.45 grams of DOWFAX 2A1™ and 291.85 grams of deionized water) for 30 minutes at room temperature (of about 25° C.) 9.4 grams of seed was removed from the monomer emulsion and added to the reactor at a temperature of about 75° C., and stirred for 5 minutes at about 75° C. An initiator solution prepared from 9.21 grams of ammonium persulfate in 45.40 grams of deionized water was added to the reactor mixture over 20 minutes. Stirring continued at 75° C. for an additional 20 minutes to allow seed particle formation. The remaining monomer emulsion was fed continuously into the reactor over 180 minutes. After the above monomer emulsion addition was completed, the reaction was allowed to post react for 180 minutes at 75° C. and then cooled. The system was purged with nitrogen during the whole process. The resulting latex polymer possessed a $M_w$ (weight average molecular weight) of 29,800, an $M_n$ (number average molecular weight) of 12,000, as determined on a Waters GPC, and an on-set Tg (glass transition temperature) of 48.9° C., as measured on a Seiko DSC. The latex resin containing 41.2% solids possessed a volume average diameter of 233 nanometers as measured by light scattering technique on a Coulter N4 Plus Particle Sizer.

Example IIA

A non-ionic surfactant free latex was prepared by the semi-continuous emulsion polymerization of styrene/n-butyl acrylate/2-carboxyethyl acrylate (β-CEA) copolymer, 77/23/3 parts (by weight), using 1.35 pph of 1-dodecanethiol (DDT; the first monomer emulsion portion contained 0.677 pph and the second monomer emulsion portion contained 2.6 pph) as a chain-transfer agent, 0.68 pph of decanediol diacrylate (A-DOD) as a crosslinker and 1.5 percent by weight (based on monomer content) of ammonium persulfate as an initiator. A 1137 Liter jacketed stainless steel reactor with double flight impellers (each impeller is a four pitched-blade impeller) containing 1.59 kg of DOWFAX 2A1™ (sodium tetrapropyl diphenyloxide disulfonate, 47 percent active, available from Dow Chemical) and 430 kg of deionized water was stirred at 35 rpm while the temperature was about 75° C. In a 568 Liter Pope tank, a monomer emulsion was prepared by vigorously mixing a monomer mixture (348.48 kg of styrene, 104.09 kg of n-butyl acrylate, 13.57 kg of β-CEA, 3.08 kg of decanediol diacrylate (A-DOD) (crosslinker) and 3.064 kg of 1-dodecanethiol) with an aqueous solution (8.05 kg of DOWFAX 2A1™ and 193 kg of deionized water) for 30 minutes at room temperature (of about 25° C.) 6.98 kg of seed was removed from the monomer emulsion and pumped into a 76 Liter Pope tank and later added to the reactor at a temperature of about 75° C. and stirred. An initiator solution prepared from 6.79 kg of ammonium persulfate in 33.55 kg of deionized water was added to the reactor mixture over 20 minutes. Stirring continued at 75° C. for an additional 20 minutes to allow seed particle formation. Approximately half of the remaining monomer emulsion was fed continuously into the reactor over 120 minutes. 3.04 kg of 1-dodecanethiol was then added to the remaining emulsion in 568 Liter Pope tank and this mixture was stirred for 5 minutes before feeding of the remaining emulsion resumed. After the above monomer emulsion addition was completed, the reaction was allowed to post react for 180 minutes at 75° C. and then cooled. The system was purged with nitrogen during the whole process. The resulting latex polymer possessed a $M_w$ (weight average molecular weight) of 43,700, an $M_n$ (number average molecular weight) of 10,800, as determined on a Waters GPC, and an on-set Tg (glass transition temperature) of 52.7° C., as measured on a Seiko DSC. The latex resin containing 41.5% solids possessed a volume average diameter of 160 nanometers as measured by light scattering technique on a Coulter N4 Plus Particle Sizer.

Example IIB

A non-ionic surfactant free latex was prepared by the semi-continuous emulsion polymerization of styrene/n-butyl acrylate/2-carboxyethyl acrylate (β-CEA) copolymer, 77/23/3 parts (by weight), using 1.35 pph of 1-dodecanethiol (DDT; the first monomer emulsion portion contained 0.35 pph and the second monomer emulsion portion contained 3.21 pph) as a chain-transfer agent, 0.68 pph of decanediol diacrylate (A-DOD) as a crosslinker and 1.5 percent by weight (based on monomer content) of ammonium persulfate as an initiator. A 1137 Liter jacketed stainless steel reactor with double flight impellers (each impeller is a four pitched-blade impeller) containing 1.59 kg of DOWFAX 2A1™ (sodium tetrapropyl diphenyloxide disulfonate, 47 percent active, available from Dow Chemical) and 430 kg of deionized water was stirred at 35 rpm while the temperature was about 75° C. In a 568 Liter Pope tank, a monomer emulsion was prepared by vigorously mixing a monomer mixture (348.48 kg of styrene, 104.09 kg of n-butyl acrylate, 13.57 kg of β-CEA, 3.08 kg of decanediol diacrylate (A-DOD (crosslinker) and 1.585 kg of 1-dodecanethiol) with an aqueous solution (8.05 kg of DOWFAX 2A1™ and 193 kg of deionized water) for 30 minutes at room temperature (of about 25° C.) 6.98 kg of seed was removed from the monomer emulsion and pumped into a 76 Liter Pope tank and later added to the reactor at a temperature of about 75° C. and stirred. An initiator solution prepared from 6.79 kg of ammonium persulfate in 33.55 kg of deionized water was added to the reactor mixture over 20 minutes. Stirring continued at 75° C. for an additional 20 minutes to allow seed particle formation. Approximately 50% of the remaining monomer emulsion was fed continuously into the reactor over 120 minutes. 4.5144 kg of 1-dodecanethiol was then added to the remaining emulsion in 568 Liter Pope tank and this mixture was stirred for 5 minutes before feeding of the remaining emulsion resumed. After the above monomer emulsion addition was completed, the reaction was allowed to post react for 180 minutes at 75° C. and then cooled. The system was purged with nitrogen during the whole process. The resulting latex polymer possessed a $M_w$ (weight average molecular weight) of 67,700, an $M_n$ (number average molecular weight) of 10,600, as determined on a Waters GPC, and an on-set Tg (glass transition temperature) of 53.2° C., as measured on a Seiko DSC. The latex resin containing 41.5% solids possessed a volume average diameter of 170 nanometers as measured by light scattering technique on a Coulter N4 Plus Particle Sizer.

A summary of the physical properties of the four Examples of latex polymers are shown in Table 1.

TABLE 1

| Example | Total DDT (pph) | DDT Partition | $M_w/M_n$ (Molecular Weight Distribution: $M_wD$) | Onset Tg (° C.) |
|---|---|---|---|---|
| IA[1] | 1.50 | 0.5 pph/2.907 pph | 51200/11,700 (4.38) | 49.2 |
| IB[1] | 1.50 | none | 29,800/12,000 (2.48) | 48.9 |
| IIA[2] | 1.35 | 0.677 pph/2.6 pph | 43,700/10,800 (4.05) | 52.7 |
| IIB[2] | 1.35 | 0.35 pph/3.21 pph | 67,700/10,600 (6.39) | 53.2 |

[1] In Example IA, the latex $M_w$ (weight average molecular weight) is 21,400 higher than the latex $M_w$ (weight average molecular weight) of Example IB; $M_n$ (number average molecular weight) remains substantially similar between Examples IA to IB; and Tg (glass transition temperature) remains substantially similar between Examples IA to IB.

Comparing Examples IIA and IIB, less DDT partitioning in the first portion produced higher latex $M_w$ (weight average molecular weight) with $M_n$ (number average molecular weight) remaining substantially similar between Examples IIA to IIB and Tg (glass transition temperature) remaining substantially similar between Examples IIA to IIB.

Table 2 shows the effect of changing chain-transfer agent partitioning versus total chain-transfer agent concentration.

TABLE 2

| Total DDT (pph) | Ratio of DDT Partition | $M_w$ | $M_n$ | Molecular Weight Distribution: $M_wD$ |
|---|---|---|---|---|
| 1.71 | 32:68 | 32,800 | 11,400 | 2.9 |
| 1.54 | 32:68 | 35,300 | 12,300 | 2.9 |
| 1.37 | 32:68 | 37,800 | 12,700 | 3.0 |
| 1.54 | 26:74 | 39,400 | 11,400 | 3.5 |
| 1.54 | 13:87 | 62,000 | 11,900 | 5.2 |

Table 2 shows that when the total chain-transfer agent is varied and there is the chain-transfer agent partitioning is kept constant, the $M_w$ (weight average molecular weight) and the $M_n$ (number average molecular weight) will vary slightly, without effecting $M_wD$ (molecular weight distribution). However, when chain-transfer agent partitioning is introduced and the total concentration of the chain-transfer agent is not varied (eg. kept at 1.54), the $M_w$ (weight average molecular weight) and $M_wD$ (molecular weight distribution) varies quite significantly, with comparatively little effect on the $M_n$ (number average molecular weight).

These examples show that the chain-transfer agent partitioning in a semi-continuous process provides a wide range $M_w$ (weight average molecular weight) latex (eg. 35,300 to 62,000) without substantially varying the $M_n$ (number average molecular weight) and thus, maintaining a substantially similar Tg (glass transition temperature).

It is believed that the toners produced from the above Examples can be used for electrophotographic imaging and printing processes such as xerographic applications, digital imaging, color imaging and the like.

Other modifications of the present invention will occur to those of ordinary skill in the art subsequent to a review of the present application. These modifications and equivalents, or substantial equivalents thereof are intended to be included within the scope of the present invention.

What is claimed is:

1. A process for the preparation of a latex polymer comprising: mixing a seed particle latex, generated by aqueous emulsion polymerization of a first portion of a monomer emulsion, with a second portion of the monomer emulsion and at least one chain-transfer agent, whereby mixing is done in the presence of a free-radical initiator and heated, and wherein the monomer emulsion comprises a mixture of polymerization reagents of at least one monomer, at least one chain-transfer agent, at least one surfactant, and water.

2. A process according to claim 1, wherein the at least one chain transfer agent of the monomer emulsion is of from about 10 to about 80 percent by weight of total chain transfer agent used to prepare the latex polymer.

3. A process according to claim 2, wherein in the chain-transfer agent mixed with the seed particle latex and the second portion of the monomer emulsion is of from about 20 to about 90 percent by weight of total chain-transfer agent used to prepare the latex polymer.

4. A process according to claim 1, wherein total chain-transfer agent used is of from about 0.005 to about 10 percent by weight of total monomer used to prepare the latex polymer.

5. A process according to claim 1, wherein the at least one chain-transfer agent of the monomer emulsion and/or the at least one chain-transfer agent mixed with the seed particle latex and the second portion of the monomer are selected from the group consisting of dodecanethiol, butanethiol, isooctyl-3-mercaptopropionate (IOMP), 2-methyl-5-t-butylthiophenol, carbon tetrachloride, and carbon tetrabromide.

6. A process according to claim 1, wherein the first portion of the monomer emulsion is of from about 0.5 to about 50 percent by weight of the monomer emulsion.

7. A process according to claim 1, wherein the mixture of polymerization reagents further comprises at least one cross-linking agent.

8. A process according to claim 7, wherein said at least one crosslinking agent is selected from the group consisting of divinyl benzene, divinyl toluene, diacrylates, and dimethacrylates.

9. A process according to claim 1, wherein the mixing is done at a temperature of from about 35° C. to about 125° C.

10. A process according to claim 1, wherein, during the process, oxygen is substantially excluded.

11. A process according to claim 1, wherein the surfactant is a sulfonate of the formula:

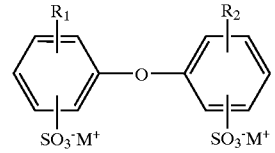

wherein $R_1$ or $R_2$ is hydrogen, or alkyl and M is hydrogen, an alkali metal, or ammonium.

12. A process according to claim 1, wherein said at least one monomer is selected from the group consisting of acrylic and methacrylic esters, styrene, vinyl esters of aliphatic acids, ethylenically unsaturated carboxylic acids, cross-linking agents and mixtures thereof.

13. A process according to claim 1, wherein the process provides a latex polymer having a $M_w$ (weight average molecular weight) in the range of from about 25,000 to 100,000 and a $M_n$ (number average molecular weight) in the range of from 8,000 to 12,000.

14. A process for the preparation of a latex polymer comprising:
   mixing a seed particle latex, generated by aqueous emulsion polymerization of a first portion of a monomer emulsion, with a second portion of the monomer emulsion, wherein the monomer emulsion is prepared by emulsification of a mixture of polymerization reagents of at least one monomer, at least one chain-transfer agent, at least one surfactant, and water; adding a third portion of the monomer emulsion;
   combining at least one chain-transfer agent with at least one of the second portion of the monomer emulsion and the third portion of the monomer emulsion; heating in the presence of a free-radical initiator to provide the latex polymer.

15. A process according to claim 14, wherein the at least one chain transfer agent of the monomer emulsion is of from about 10 to about 80 percent by weight of total chain transfer agent used to prepare the latex polymer.

16. A process according to claim 15, wherein in the chain-transfer agent combined with at least one of the second portion of the monomer emulsion and the third portion of the monomer emulsion is of from about 20 to about 90 percent by weight of total chain-transfer agent used.

17. An improved process according to claim 14, wherein the first portion of the monomer emulsion is of from about 0.5 to about 33 percent by weight of the monomer emulsion.

18. A process according to claim 17, wherein the second portion of the monomer emulsion is of from about 33 to about 65 percent by weight of the monomer emulsion.

19. A process according to claim 14, wherein the mixture of polymerization reagents further comprises at least one cross-linking agent.

20. A process according to claim 14, wherein the at least one chain-transfer agent of the monomer emulsion and/or the at least one chain-transfer agent of (iii) are selected from the group consisting of dodecanethiol, butanethiol, isooctyl-3-mercaptopropionate (IOMP), 2-methyl-5-t-butylthiophenol, carbon tetrachloride, and carbon tetrabromide.

21. A process according to claim 14, wherein the process provides a latex polymer having a $M_w$ (weight average molecular weight) in the range of from about 25,000 to 100,000 and a $M_n$ (number average molecular weight) in the range of from 8,000 to 12,000.

22. A process for the preparation of a latex polymer comprising:
  (i) preparing a monomer emulsion by emulsification of a mixture of polymerization reagents of at least one monomer, at least one chain-transfer agent, at least one surfactant, and water, and wherein said emulsification is accomplished at a temperature of from about 5° C. to about 40° C.;
  (ii) preparing a seed particle latex by aqueous emulsion polymerization of a first portion of the monomer emulsion of (i), wherein the first portion of the monomer emulsion of (i) is of from about 0.5 to about 33 percent by weight of the monomer emulsion of (i), and wherein the seed particle latex is maintained at a temperature of from about 35° C. to about 125° C.;
  (iii) adding a second portion of the monomer emulsion of (i) to the seed particle latex of (ii), wherein the second portion of the monomer emulsion of (i) is of from about 33 to about 65 percent by weight of the monomer emulsion of (i);
  (iv) adding a third portion of the monomer emulsion of (i) to the seed particle latex of (iii);
  (v) combining at least one chain-transfer agent, of from about 20 to about 90 percent by weight of total chain-transfer agent, with at least one of the second portion of the monomer emulsion and the third portion of the monomer emulsion;
  (vi) including an initiator, of from about 0.1 to about 10 percent by weight of total monomer used to prepare the latex polymer, in at least one of (i) and (ii); and
  (vii) heating the combination of (i) to (vi), at a temperature offrom about 35° C. to about 125° C., to provide the latex polymer.

23. A process according to claim 22, further comprising the preparation of an aqueous solution of at least one surfactant, wherein the aqueous solution is combined with the first portion of the monomer emulsion of (i) to form the seed particle latex of (ii).

24. A process for the preparation of toner comprising aggregating a colorant dispersion with the latex polymer of claim 1 and coalescing or fusing the aggregates generated.

25. A process for the preparation of toner comprising aggregating a colorant dispersion with the latex polymer of claim 14 and coalescing or fusing the aggregates generated.

26. A process for the preparation of a polymer comprising mixing a seed particle latex, generated by the aqueous emulsion polymerization of a first portion of a monomer emulsion, with a second portion of a monomer emulsion and at least one chain-transfer agent in the presence of a free-radical initiator; heating, and wherein the monomer emulsion comprises at least one monomer, at least one chain-transfer agent, and at least one surfactant.

* * * * *